(12) United States Patent
Benjamin et al.

(10) Patent No.: US 12,431,937 B2
(45) Date of Patent: Sep. 30, 2025

(54) SELF-INTERFERENCE CANCELLER

(71) Applicant: Intel Corporation, Santa Clara, CA (US)

(72) Inventors: Ofer Benjamin, Petah Tikva (IL); Eli Borokhovich, Modiin-Maccabin-Reut (IL); Brent Carlton, Portland, OR (US); Ofir Degani, Nes-Ammin (IL); Ronen Kronfeld, Shoham (IL); Stefano Pellerano, Beaverton, OR (US); Mustafijur Rahman, Hillsboro, OR (US); Ehud Reshef, Qiryat Tivon (IL); Sarit Zur, Petah Tikva (IL)

(73) Assignee: Intel Corporation, Santa Clara, CA (US)

( * ) Notice: Subject to any disclaimer, the term of this patent is extended or adjusted under 35 U.S.C. 154(b) by 280 days.

(21) Appl. No.: 18/040,230

(22) PCT Filed: Jun. 25, 2021

(86) PCT No.: PCT/US2021/039169
§ 371 (c)(1),
(2) Date: Feb. 1, 2023

(87) PCT Pub. No.: WO2022/066255
PCT Pub. Date: Mar. 31, 2022

(65) Prior Publication Data
US 2023/0291433 A1  Sep. 14, 2023

Related U.S. Application Data

(60) Provisional application No. 63/082,331, filed on Sep. 23, 2020.

(51) Int. Cl.
*H04B 1/525* (2015.01)
*H04B 1/10* (2006.01)

(52) U.S. Cl.
CPC .......... *H04B 1/525* (2013.01); *H04B 1/1036* (2013.01)

(58) Field of Classification Search
CPC ............................ H04B 1/525; H04B 1/1036
See application file for complete search history.

(56) References Cited

U.S. PATENT DOCUMENTS

| 6,323,692 | B1 | 11/2001 | Tsinker |
| 6,539,204 | B1 | 3/2003 | Marsh et al. |
| 7,761,076 | B1 | 7/2010 | Roo |
| 2003/0104787 | A1* | 6/2003 | Blount ............... H04B 7/18517 455/1 |
| 2008/0129343 | A1 | 6/2008 | Kenney et al. |
| 2011/0044409 | A1* | 2/2011 | Yoshimoto ............. H04J 11/004 375/340 |

(Continued)

OTHER PUBLICATIONS

Sep. 21, 2021 (PCT) International Search Report—App. PCT/US2021/039169.

*Primary Examiner* — Dominic E Rego
(74) *Attorney, Agent, or Firm* — Banner & Witcoff Ltd.

(57) ABSTRACT

A transceiver may include a transmit path and a receive path that are each coupled to a radio frequency (RF) interface, and a self-interference canceller (SIC). The SIC is coupled between the transmit and the receive paths. The SIC is configured to cancel a self-interference signal from a received signal on the receive path based on a transmit signal on the transmit path.

19 Claims, 29 Drawing Sheets

(56) References Cited

U.S. PATENT DOCUMENTS

| | | | |
|---|---|---|---|
| 2015/0043323 A1 | 2/2015 | Choi et al. | |
| 2015/0318976 A1* | 11/2015 | Eltawil | H04B 1/44 370/278 |
| 2015/0341131 A1* | 11/2015 | Sano | H04W 72/23 370/329 |
| 2015/0358104 A1* | 12/2015 | Ohwatari | H04J 11/005 370/252 |
| 2015/0372777 A1* | 12/2015 | Sano | H04J 11/004 370/329 |
| 2016/0056878 A1* | 2/2016 | Ohwatari | H04J 11/005 455/501 |
| 2016/0226535 A1* | 8/2016 | Choi | H04B 1/525 |
| 2016/0241282 A1* | 8/2016 | Sano | H04J 11/004 |
| 2016/0285504 A1 | 9/2016 | Hua | |
| 2016/0337160 A1* | 11/2016 | Sano | H04B 7/10 |
| 2021/0167810 A1* | 6/2021 | Regev | H04B 1/0458 |

\* cited by examiner

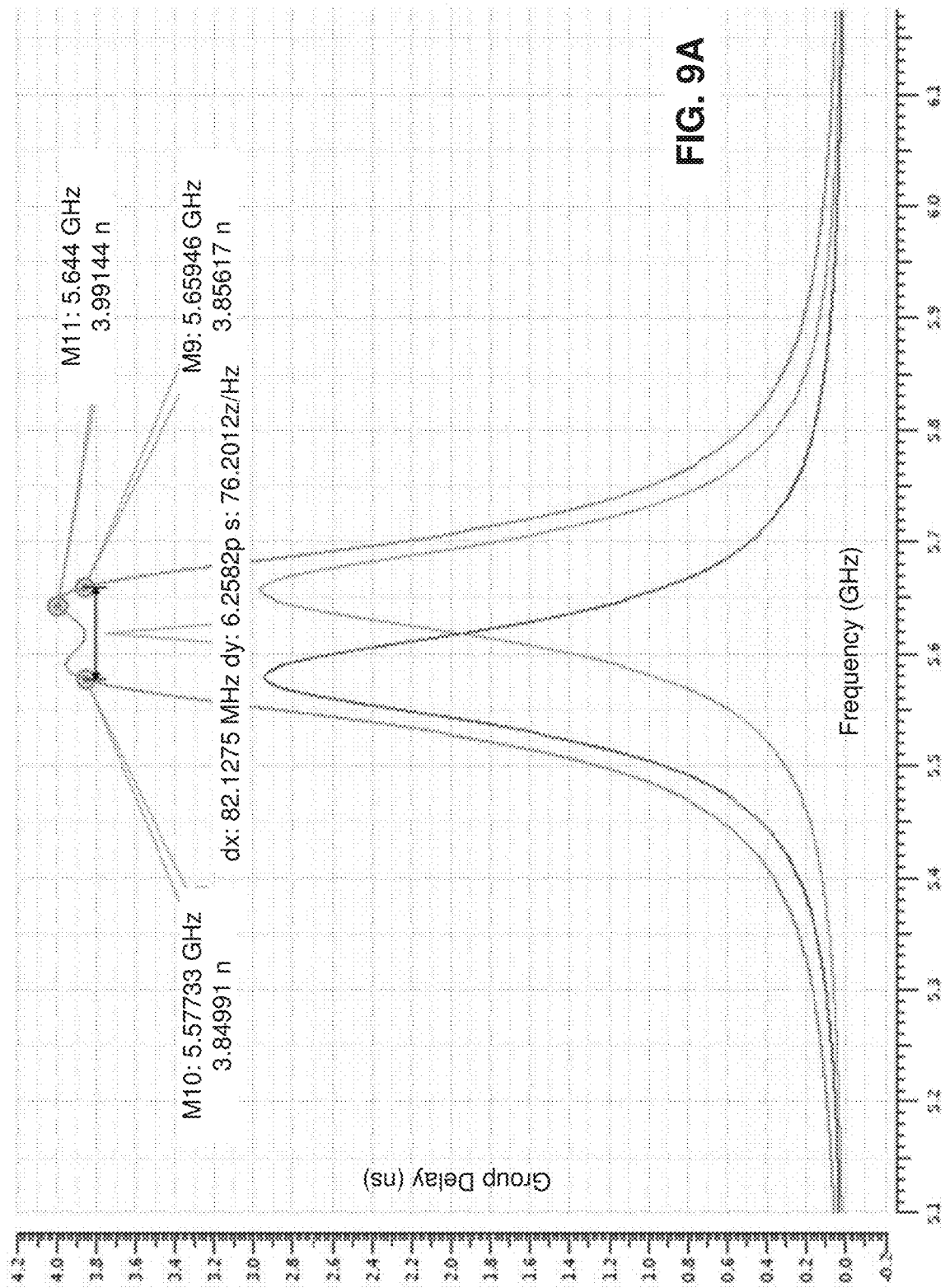

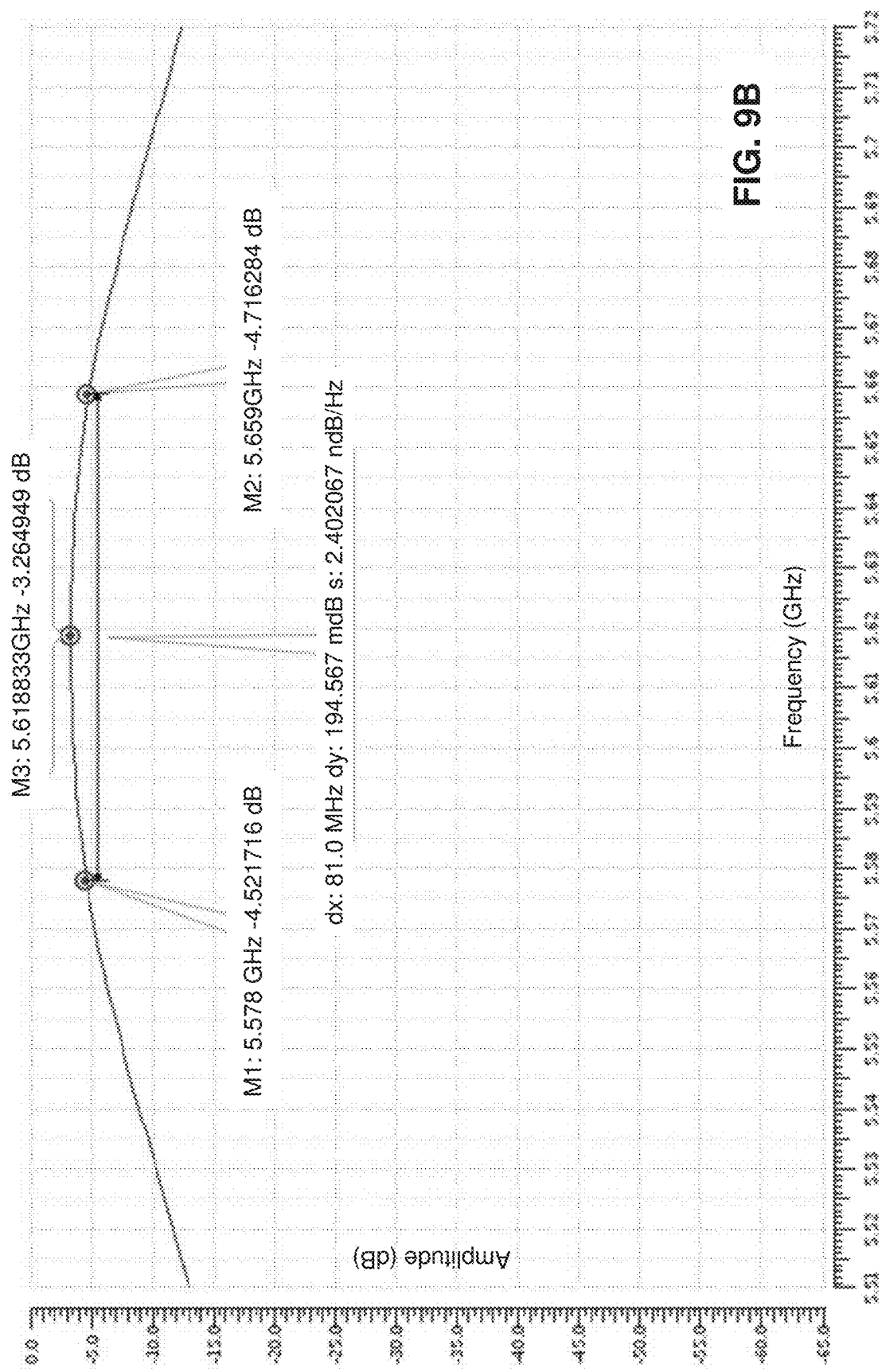

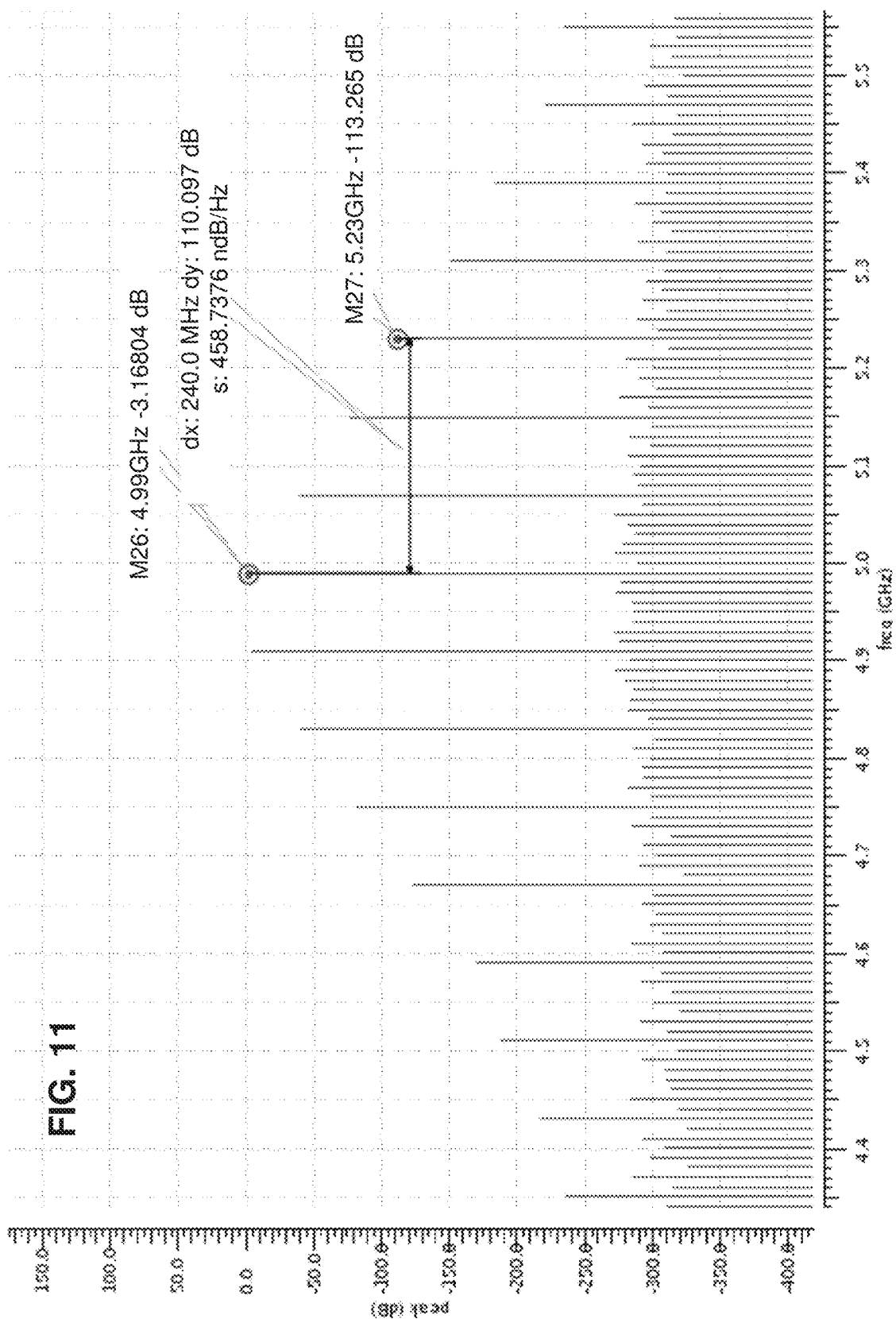

SELF-INTERFERENCE CANCELLER

CROSS REFERENCE TO RELATED APPLICATIONS

This patent application is a U.S. National Stage of PCT Application No. PCT/US2021/039169, filed Jun. 25, 2021, which claims priority to, and the benefit of, U.S. Provisional Patent Application No. 63/082,331, filed Sep. 23, 2020. Each of these applications is incorporated herein by reference in its entirety.

BACKGROUND

Field

Various aspects of this disclosure generally relate to self-interference cancellation devices, including self-interference cancellation devices for full-duplex communications.

Related Art

Frequency division duplex (FDD) communication systems are communication systems where information is simultaneously sent in both directions, for example when the radio transmits and receives signals at the same time (e.g. from a first node to a second node and from a second node to a first node). To avoid the data transmissions between nodes disturbing or interfering with one another, the two frequency division duplex links work at different frequencies.

However, in such systems, the transmitter may cause interference in the receiver due to simultaneous operation, which inhibits achieving full-duplex operation. A diplexer may be used to suppress this interference at the frontend to some extent followed by active cancellation technique (e.g. in the radio-frequency (RF) domain) using one or more filters. The group delay the diplexer can be in the order of a few nanoseconds, which impacts the design of integrated filters because the filters are required to synthesize nanoseconds of delay at RF in silicon.

As the separation in frequency ($\Delta F$) between the transmit frequency FTX and the receive frequency FRX decreases, it becomes increasingly difficult to achieve large isolation and consequently the filter design becomes more complex and requires filters of higher order.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIGS. 9A-9B show plots of the group delay and amplitude with respect to frequency in accordance with the present disclosure.

FIG. 11 shows a plot of the output spectrum of the delay cell in accordance with the present disclosure.

The present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the present disclosure. However, it will be apparent to those skilled in the structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

A self-interference canceller (SIC) according to the disclosure is configured to synthesize delay (e.g. nanoseconds of delay) at RF (radio frequency) and perform interference cancellation. The SIC includes one or more low-power, Q-enhanced delay cells. The delay cells may include a complex tap on-chip FIR (finite impulse response) filter. The SIC may be used in combination with one or more active and/or passive filters to remove high power transmitter blocking signals that leak and de-senses the receiver and/or remove transmitter noise in the receiver band that leak to the receiver. Quality (Q) factor is the ratio of the inductive reactance of an inductor to the resistive impedance thereof. The disclosure further includes on-chip Q and frequency calibration techniques for precisely setting the operating frequency and stagger two (or more) cells to achieve wide bandwidth and also to avoid any oscillation by providing necessary current bias backoff. The present disclosure is applicable for various wireless communication technologies, such as one or more mobile communication protocols including the 3G (e.g. Universal Mobile Telecommunications System—UMTS), the 4G (e.g. Long Term Evolution—LTE), and the 5G mobile radio communication standards in accordance with corresponding 3GPP (3rd Generation Partnership Project) standards, one or more wireless local area networking (WLAN) communication protocols (e.g. IEEE 802.11 protocols), and/or one or more other communication protocols (e.g. Bluetooth, millimeter wave (mmWave), microwave). The disclosure is not limited to these exemplary communication protocols and technologies and the teachings of this disclosure are applicable to other communication protocols and technologies as would be understood by one of ordinary skill in the art.

Figure 1:
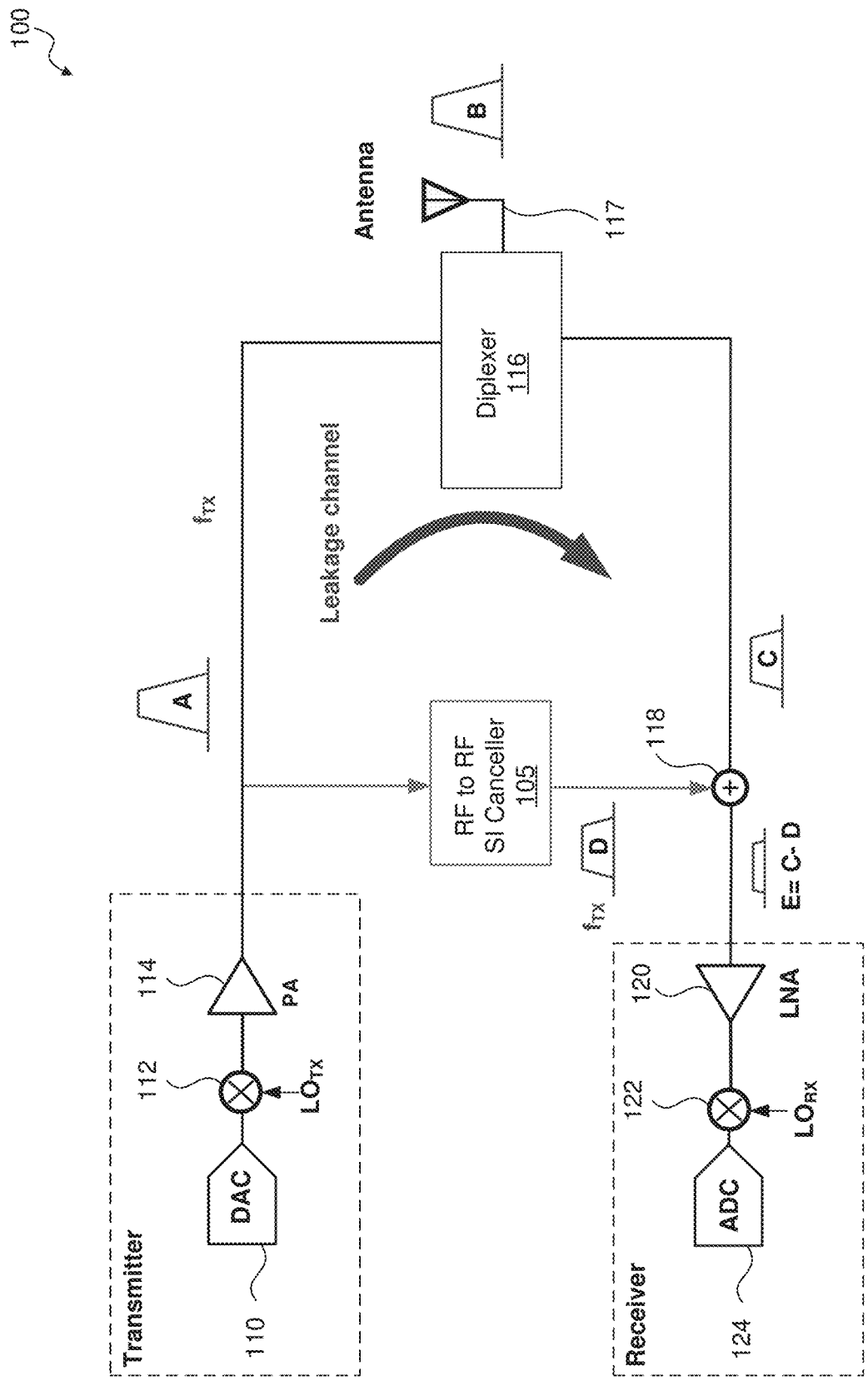
FIG. 1 shows a communication device in accordance the present disclosure.

A wireless communication device 100 according to the disclosure is illustrated in FIG. 1. The communication device 100 includes a transceiver having a transmitter (Tx) and receiver (Rx).

The transmitter includes a digital-to-analog converter (DAC) 110 that is configured to convert a digital baseband signal to an analog baseband signal, a mixer 112 that is configured to mix (up-convert) the analog baseband signal based on local oscillator signal ($LO_{TX}$) to generate an radio frequency (RF) signal, and a power amplifier (PA) 114 that is configured to amplify the RF signal. The RF signal is then transmitted by the antenna 117 via the diplexer 116.

The receiver includes a low-noise amplifier (LNA) 120 that receives a received RF signal from the antenna 117 and amplifies this low-power signal without significantly degrading its signal-to-noise ratio. This amplified signal is then mixed (down-converted) based on a local oscillator signal ($LO_{RX}$) by mixer 122 to generate analog baseband signal. The analog-to-digital converter (ADC) 124 then converts this signal to a digital baseband signal.

Figure 2A:
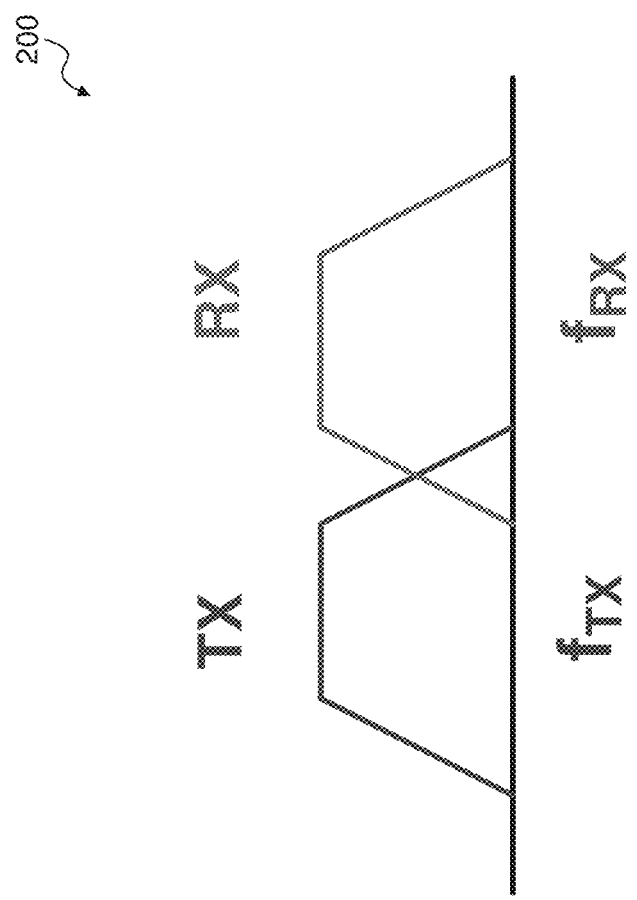
FIG. 2A shows the frequency plot of a duplex operation in accordance with the present disclosure.
Figure 2C:
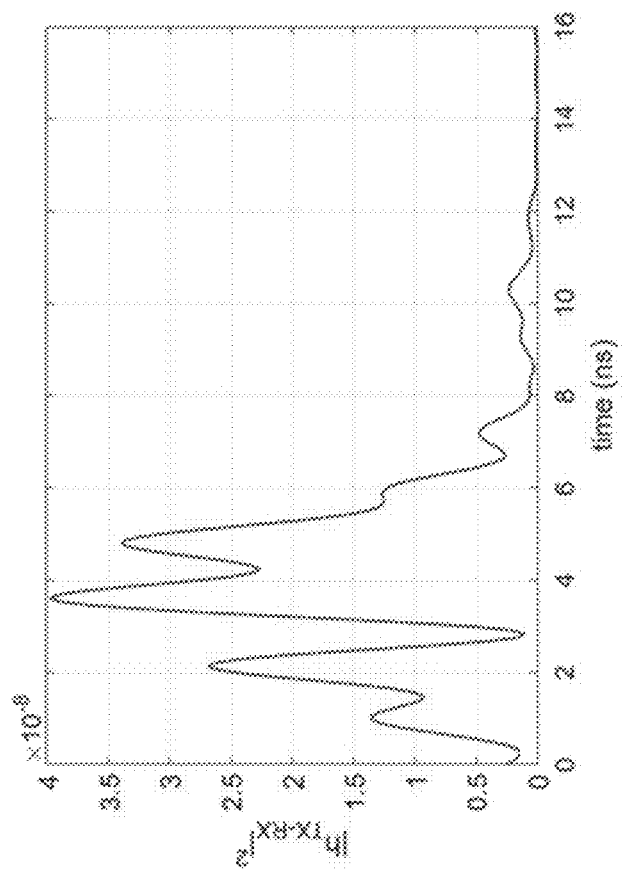
FIG. 2C shows a plot of the impulse response of the diplexer in accordance with the present disclosure.
Figure 2B:
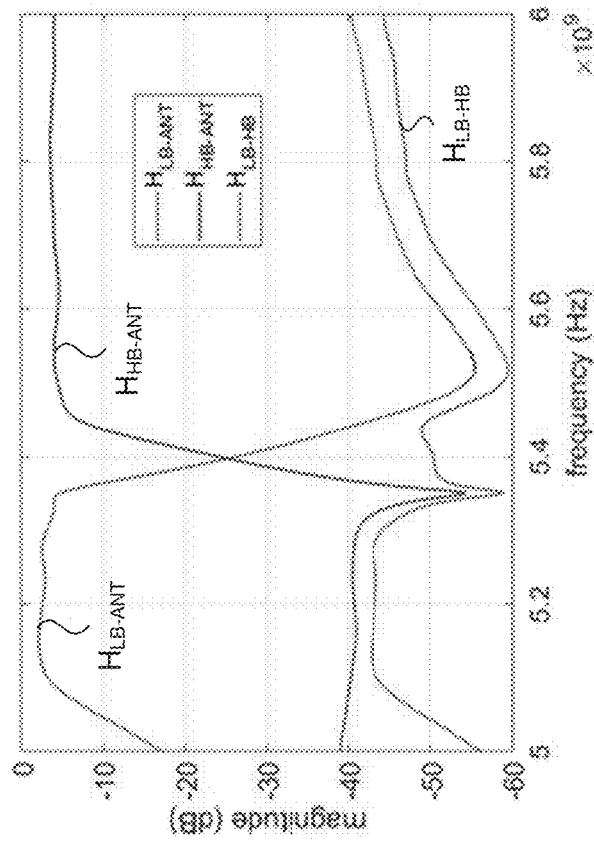
FIG. 2B shows a plot of the frequency response of the diplexer in accordance with the present disclosure.

The communication device 100 is configured for simultaneous multichannel (SMC) radio operations using Frequency Division Duplex (FDD). In FDD operations, both the transmitter and receiver operate at the same time but at different frequencies (as illustrated in FIG. 2A). As shown in FIG. 1, due to simultaneous operation and the limited isolation of the diplexer 116, the transmitted signal acts as a blocker to the receiver (as illustrated by signal C, which is known as self-interference signal). The isolation provided by the diplexer 116 may not be sufficient and may result in the self-interference signal C compressing the receiver and hindering its functionality. The characteristics of the diplexer 116 are illustrated in FIGS. 2B and 2C, including the frequency response (FIG. 2B) and the impulse response (FIG. 2C). The typical peak group delay in a diplexer is in the order of 2-5 nanoseconds. The diplexer 116 has a peak group delay of 4 nanoseconds as shown in FIGS. 2B and 2C, but is not limited thereto.

The communication device 100 includes a self-interference canceller 105 that is configured to tap into the transmitted signal A and generate a replica signal D of the self-interference signal C by mimicking the leakage channel response through the diplexer 116. For example, the self-interference canceller 105 may be configured to simulate or otherwise approximate the leakage channel response through the diplexer 116 to generate the replica signal D that corresponds to the self-interference signal C. This replica signal D is subtracted from the self-interference signal C at the receiver input (using adder/subtractor 118) to achieve cancellation signal E (i.e., E=C−D), thereby preventing the receiver from compression. The self-interference canceller 105 may include processing circuitry that is configured to perform the functions of the self-interference canceller 105, including generating the replica signal D. The self-interference canceller 105 may be a RF-to-RF self-interference canceller, but is not limited thereto. For example, the self-interference canceller 105 may be a digital baseband FIR self-interference canceler.

Figure 3:
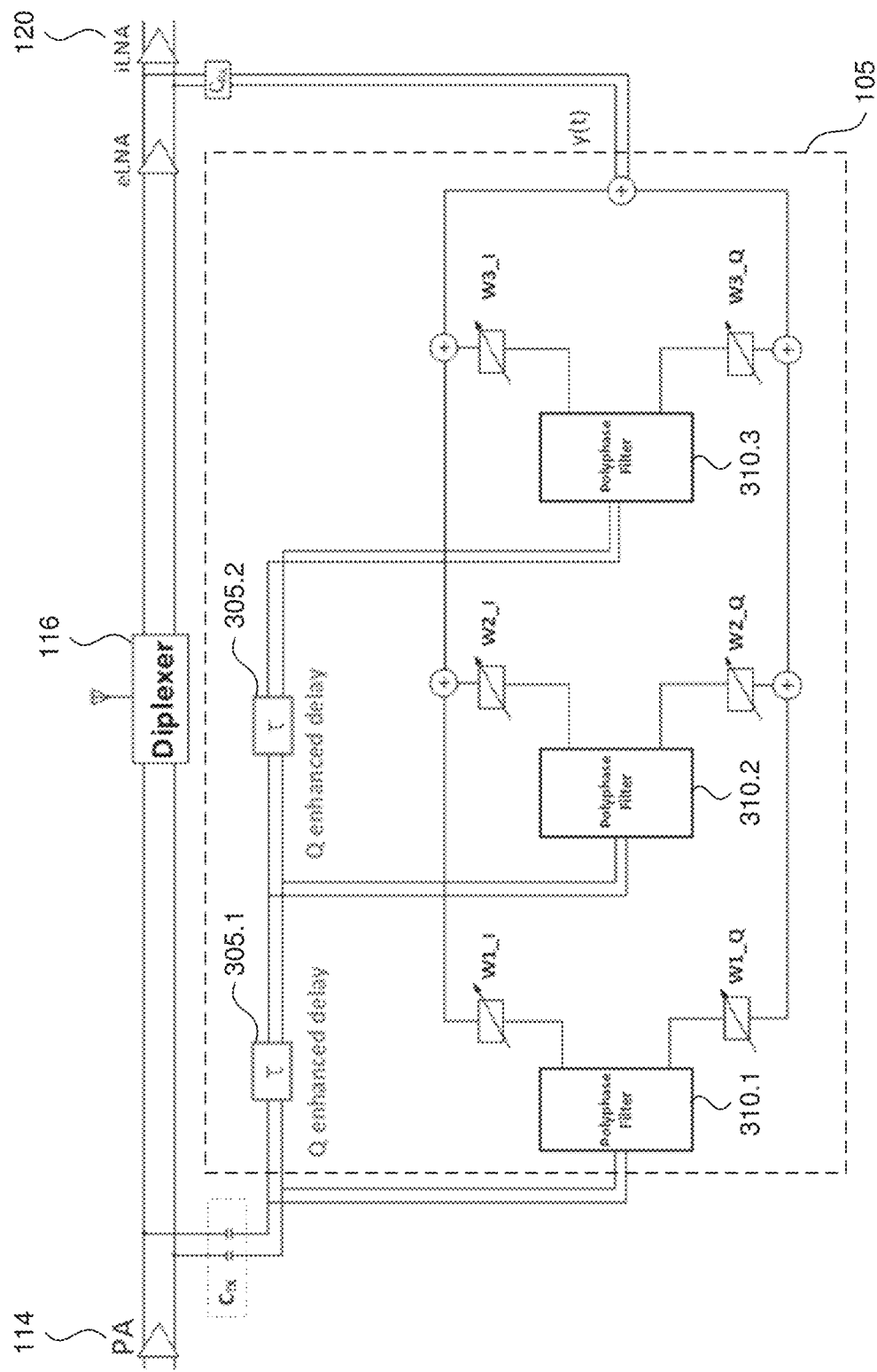
FIG. 3 shows a communication device in accordance with the present disclosure.

As shown in FIG. 3, the self-interference canceller 105 may be a complex tap FIR (finite impulse response) filter which uses, at RF, delay cells 305 and polyphaser filters 310, as shown in FIG. 3. In order to equalize for the diplexer delay, the FIR of the canceller 105 is configured to be greater than or equal to the diplexer delay. If the FIR of the canceller 105 is less than the diplexer delay, the FIR becomes highly sensitive to the tap coefficients and it may have to implement a notch response which may cause transmitter noise in the receiver band to flow through the canceller 105 and desensitize the receiver.

Figure 4A:
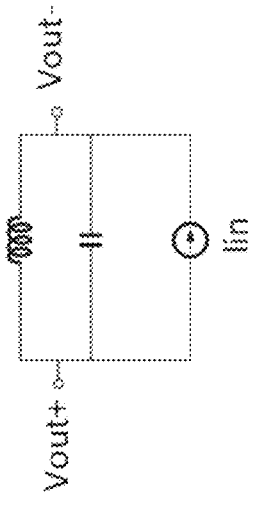
FIGS. 4A-4C show delay units in accordance with the present disclosure.
Figure 4B:
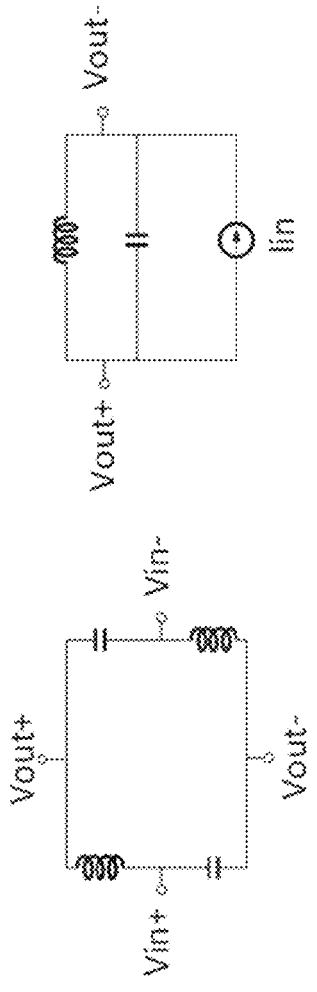
Figure 4C:
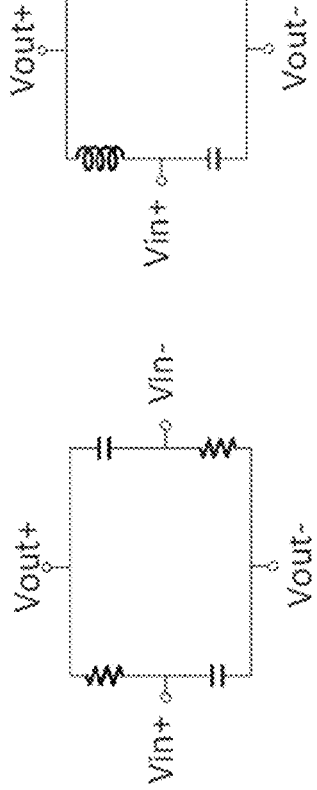

For synthesizing delays at RF, the delay cells 305 may include, as a delay unit, an RC-RC all pass (FIG. 4A), an LC-LC all pass (FIG. 4B), or an LC tank (FIG. 4C). The group delay of an RC-RC all pass cell is maximized at the RC pole frequency. Setting the pole frequency to, for example, 5.5 GHz (mid operating frequency of high band Wi-Fi) results in group delay of $1/(2*pi*fpole) \approx 30$ ps. Therefore, in order to synthesize 4 nanoseconds, more than 130 stages would be needed. This may result in a power consumption in the order of 130 milliwatts or more. The group delay of an LC-LC all pass filter is given by 2Q/ωo. With a typical Q of 15 for on-chip inductors, the achievable group delay is in the order of 950 ps, which would require at least five stages. This would result a large area for the inductors. LC-LC all pass also consume large amounts of power because, at resonance, the load is very small in the order of Rs/2 where Rs (2-5 ohms) is the equivalent series resistance of the inductor. Further, it requires two inductors consuming more area.

Figure 5A:
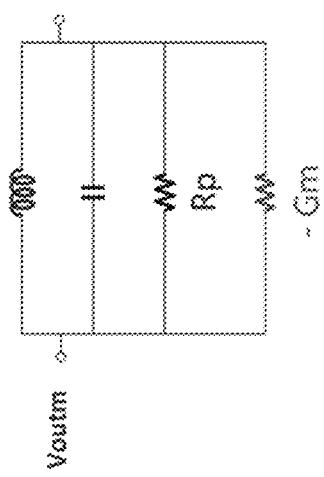
FIG. 5A shows a delay unit in accordance with the present disclosure.

The self-interference canceller 105 according to the disclosure may include an inductor-capacitor (LC) tank as the delay cell 305, as illustrated in FIG. 5A. The group delay of an LC tank is given by 2Q/ωo and the delay is same as LC-LC all pass. However, it requires only one inductor and the drivers consume less power since it drives the equivalent parallel resistance Rp (few hundreds of ohms) of an LC tank. Here, more than 4 stages would be needed to match the delay of the diplexer 116, which would consume area due to the inductors as well as consume power. Moreover, the amplitude and group delay response may not be flat enough to achieve at least 20 dB cancellation for 80 MHz signal.

Figure 5B:
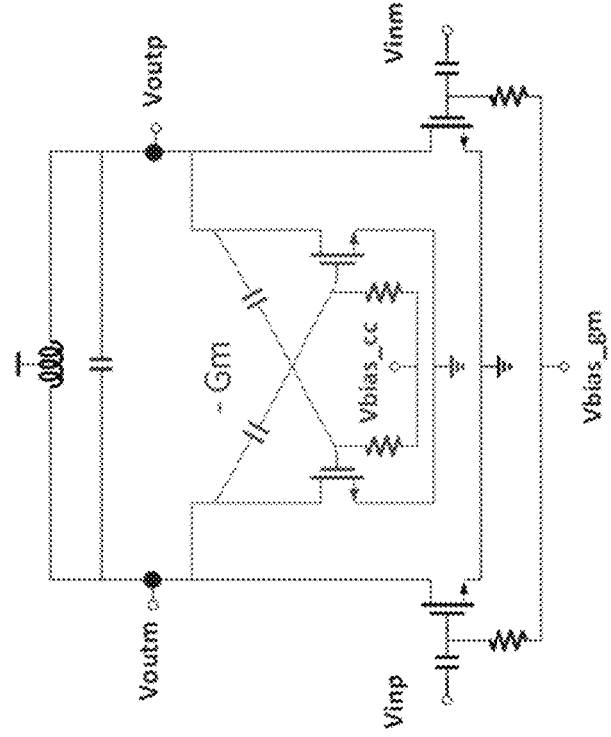
FIG. 5B shows an enhanced Q delay unit in accordance with the present disclosure.
Figure 6:
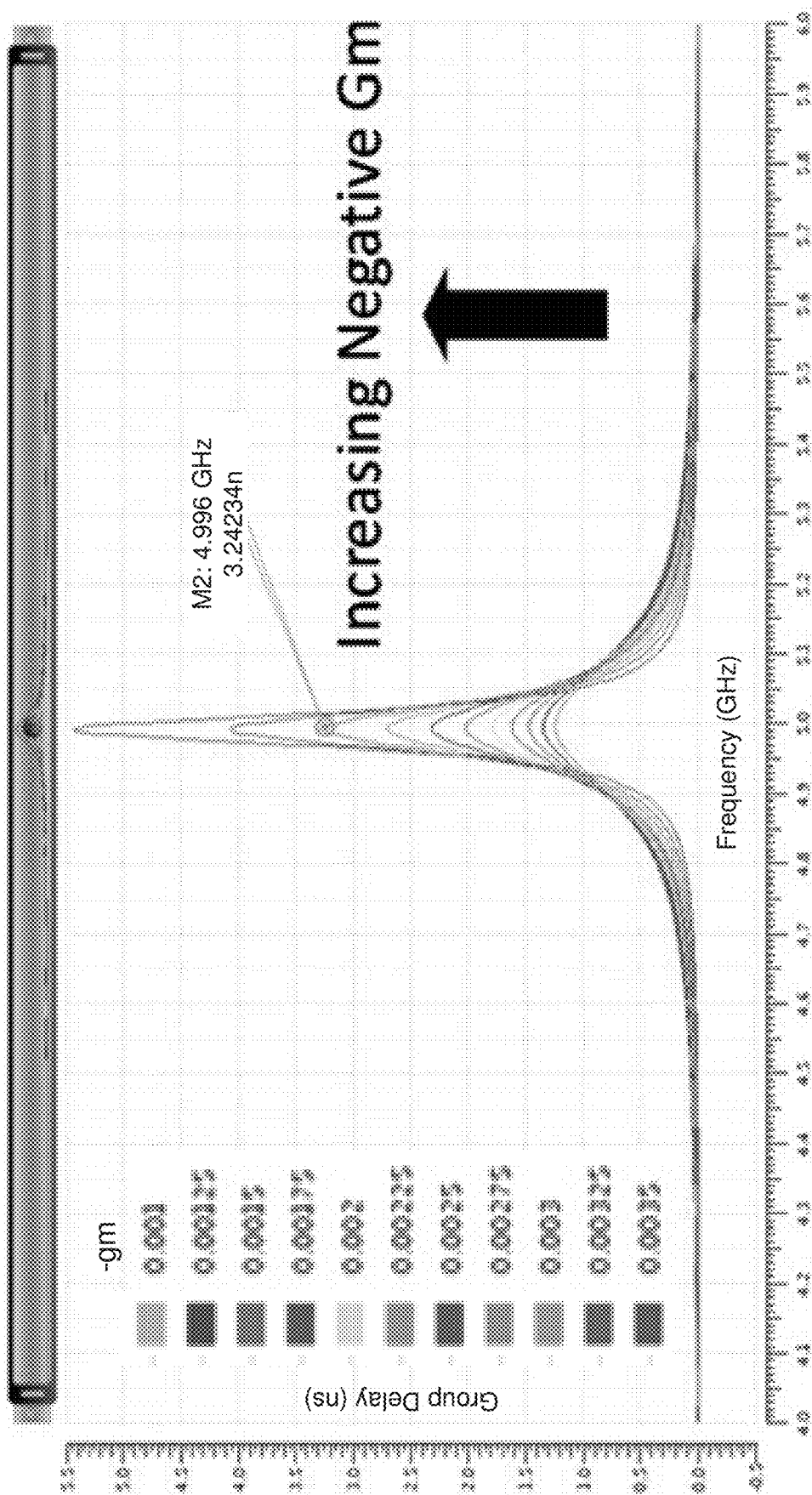
FIG. 6 shows a plot of the group delay of the delay unit with respect to frequency in accordance with the present disclosure.
Figure 7:
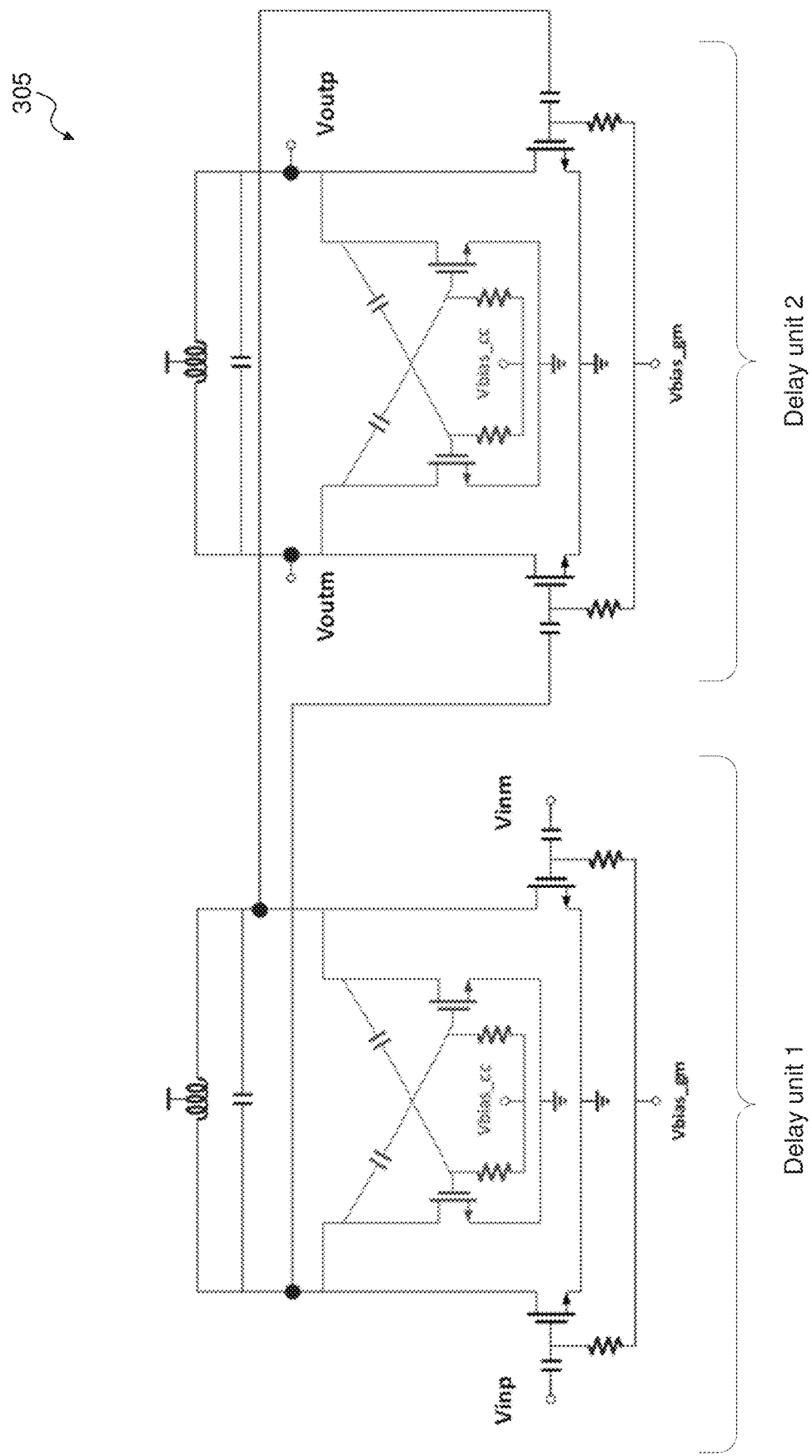
FIG. 7 shows a delay cell in accordance with the present disclosure.
Figure 8:
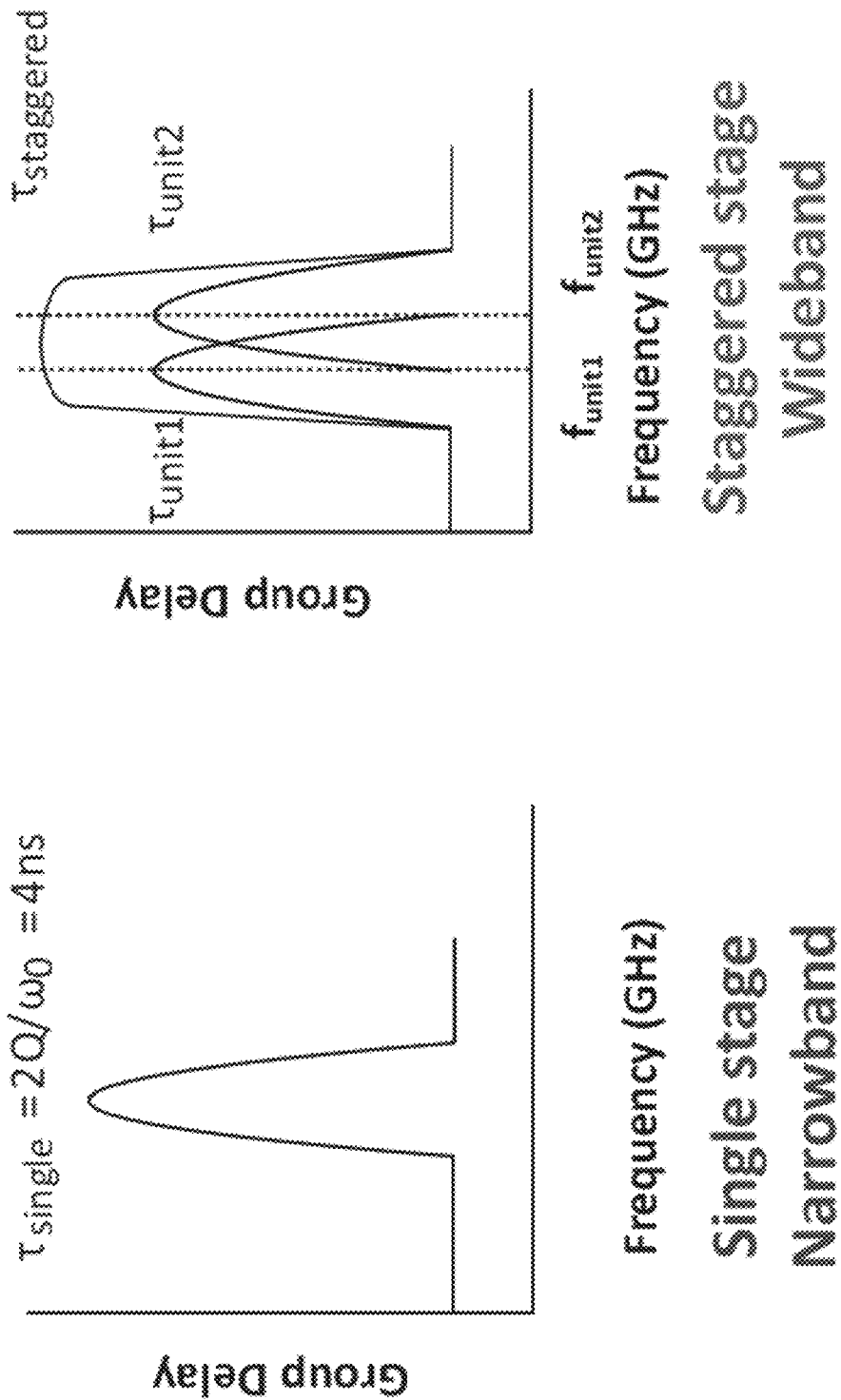
FIG. 8 shows plots of group delay for a single stage and staggered stage in accordance with the present disclosure.

The LC tank of the delay cell 305 may include an adjustable negative transconductance (−Gm). For example, the negative transconductance of the LC tank may be adjusted to increase the negative transconductance. The LC tank of the delay cell 305 may include a cross-couple pair (as shown in FIG. 5B) that is configured to enhance the Q of the LC tank by increasing the negative transconductance. The group delay of the Q-enhanced LC tank vs frequency with increasing negative Gm is illustrated in FIG. 6. As shown in FIG. 7, to achieve a flatter delay response as compared to a single LC tank, the delay cell 305 may include two (or more) staggered LC tanks of FIG. 5B. In this staggered configuration, each of the LC tanks having a cross-couple pair can be referred to as a delay unit. Therefore, the delay cell 305 may include two (or more) delay units. The differences in performance between the single stage LC tank (i.e. single delay unit) and staggered LC tank stages (i.e. two delay units in a staggered configuration) are illustrated in FIG. 8.

FIGS. 9A and 9B show simulation results that include the group delay response (FIG. 9A) and the amplitude response (FIG. 9B) of the staggered delay cell. In this example, the staggered delay cell consumes 14 mA of current while each cell consumes 7 mA of current. The delay cells have sufficient out of band dynamic range of 86 dB to achieve sufficient cancellation without desensitizing the receiver.

Figure 10A:
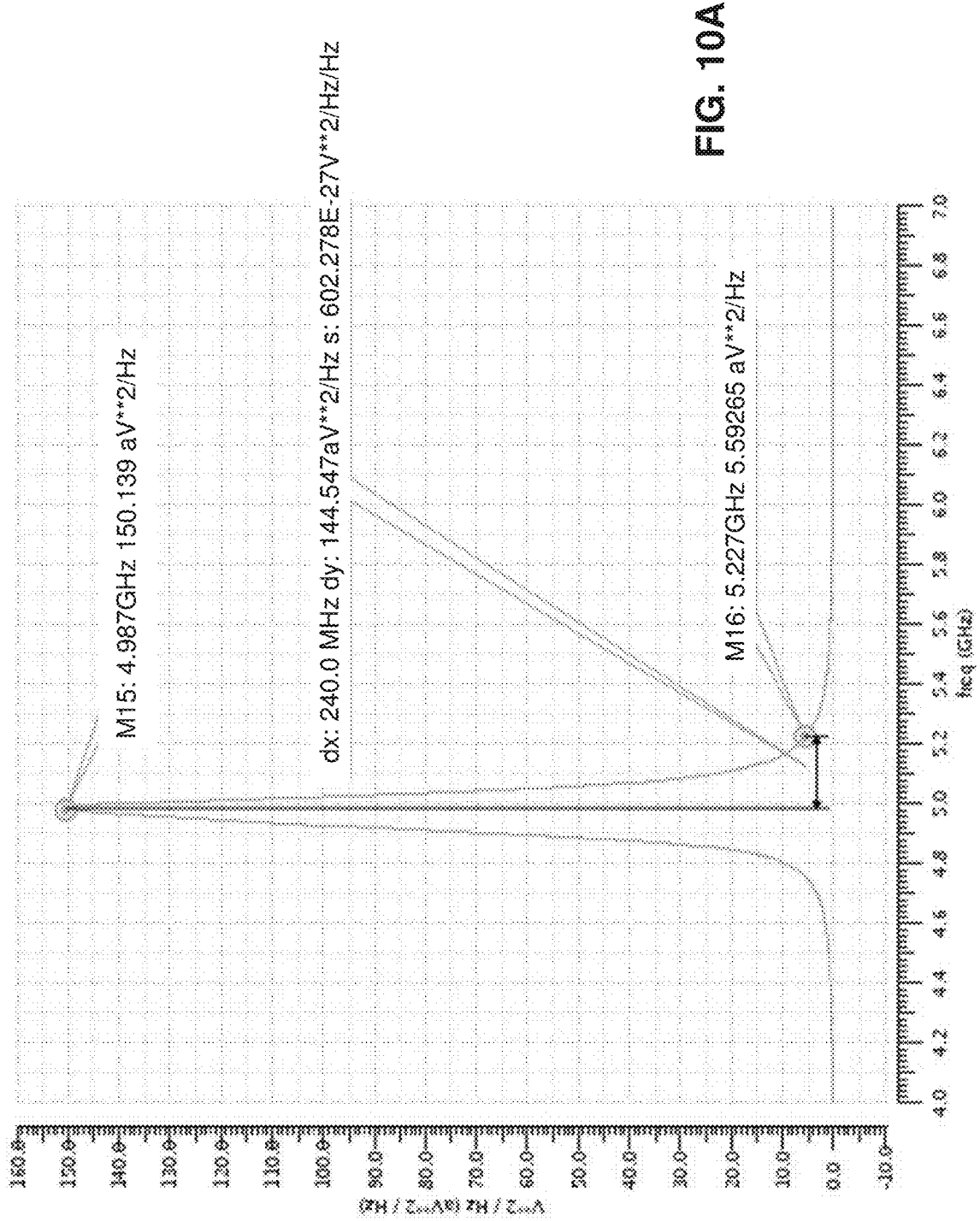
FIGS. 10A-10B show plots of delay cell characteristics in accordance with the present disclosure.
Figure 10B:
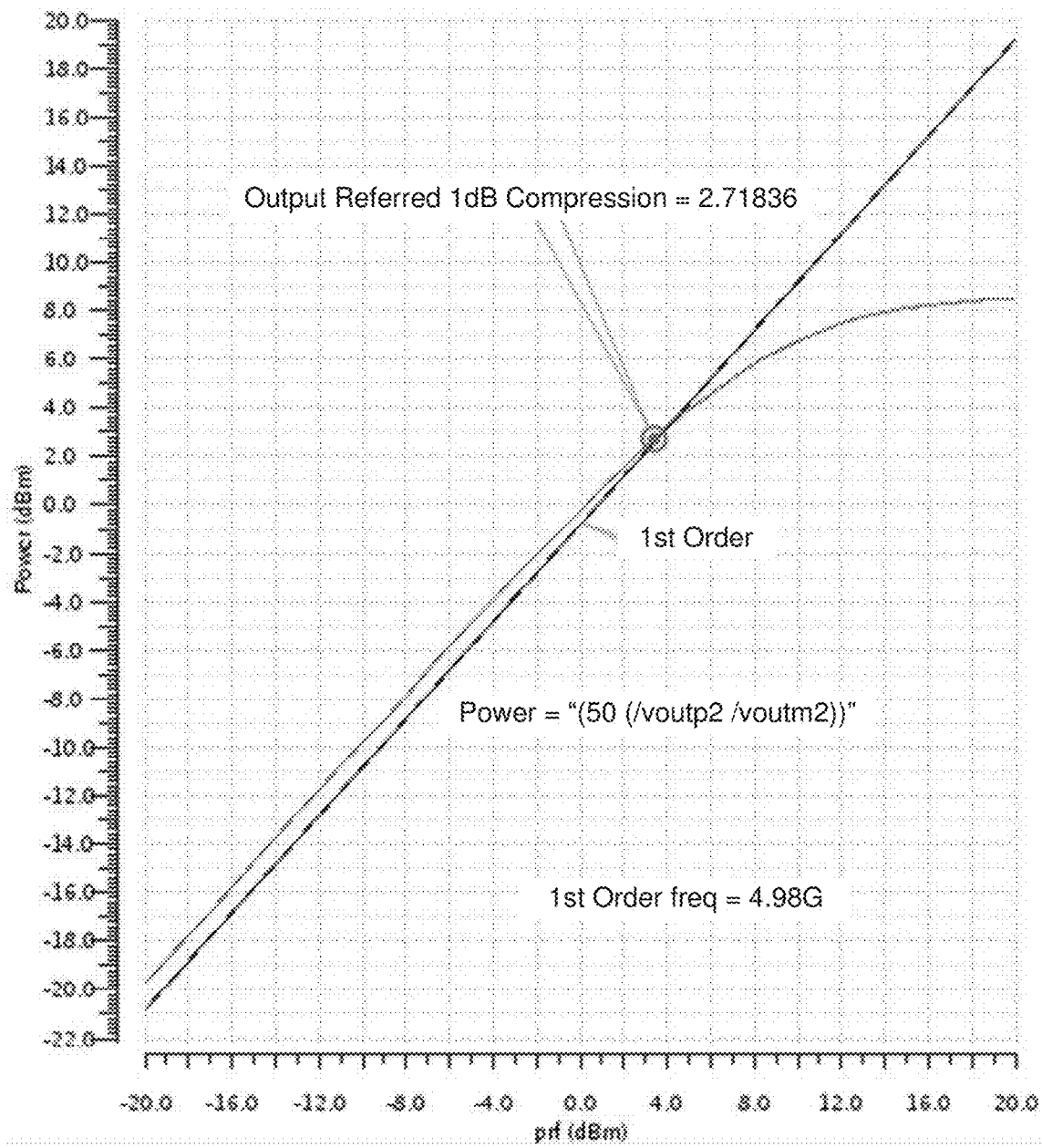

FIGS. 10A-10B show Simulated OP1 dB and noise at RX band of the Q enhanced staggered delay cell. As shown, the simulated OP1 dB of the delay unit is 2.7 dBm, which translates to peak voltage of 0.431 V. The out-of-band noise at 240 MHz offset (closest mid TX to mid RX spacing) is 5.6 aV$^2$/Hz. This leads to an SNR of 86.17 dB over channel bandwidth of 80 MHz. This SNR is the ratio of peak signal strength in TX band to RMS noise power in RX band.

FIG. 11 shows the two tone output spectrum of the delay cell. The IM7 distortion component is −110 dBc with two tone power of −3.16 dBm resulting in −3.16+6=2.84 dBm peak power.

As discussed above, the self-interference canceller 105 is configured such that the Q of an LC tank is enhanced (e.g. increased) to increase the group delay of the LC tank of the delay cell 305. The group delay of an LC tank is given by 2Q/ωo. By introducing a small negative Gm in the LC tank, the Q is enhanced and therefore the group delay of the LC tank is increased. As shown in FIG. 6, the simulated group delay vs frequency of an LC tank is provided, which shows that as the value of negative Gm is increased, the group delay of the LC tank increases. At, for example, 5 GHz, a group delay of 3 ns can be synthesized by enhancing the Q of the tank to 47. As shown in FIG. 6, the delay and gain becomes highly narrowband as the Q is increased.

Advantageously, the RF self-interference canceller 105 is configured to cancel the leakage/self-interference signal flowing through the diplexer 116 as a result of insufficient out of band rejection of the diplexer 116. Because the transmit/self-interference frequency and the receive frequency are different, the self-interference canceller 105 is configured to cancel out the out-of-band noise and nonlinearity of the canceller 105 at the RX band to prevent desensitization of the receiver. Advantageously, the out-of-band noise and nonlinearity is filtered out by the enhanced Q. Moreover, the delay cells have −3 dB of gain which keeps linearity further under control.

Figure 12:
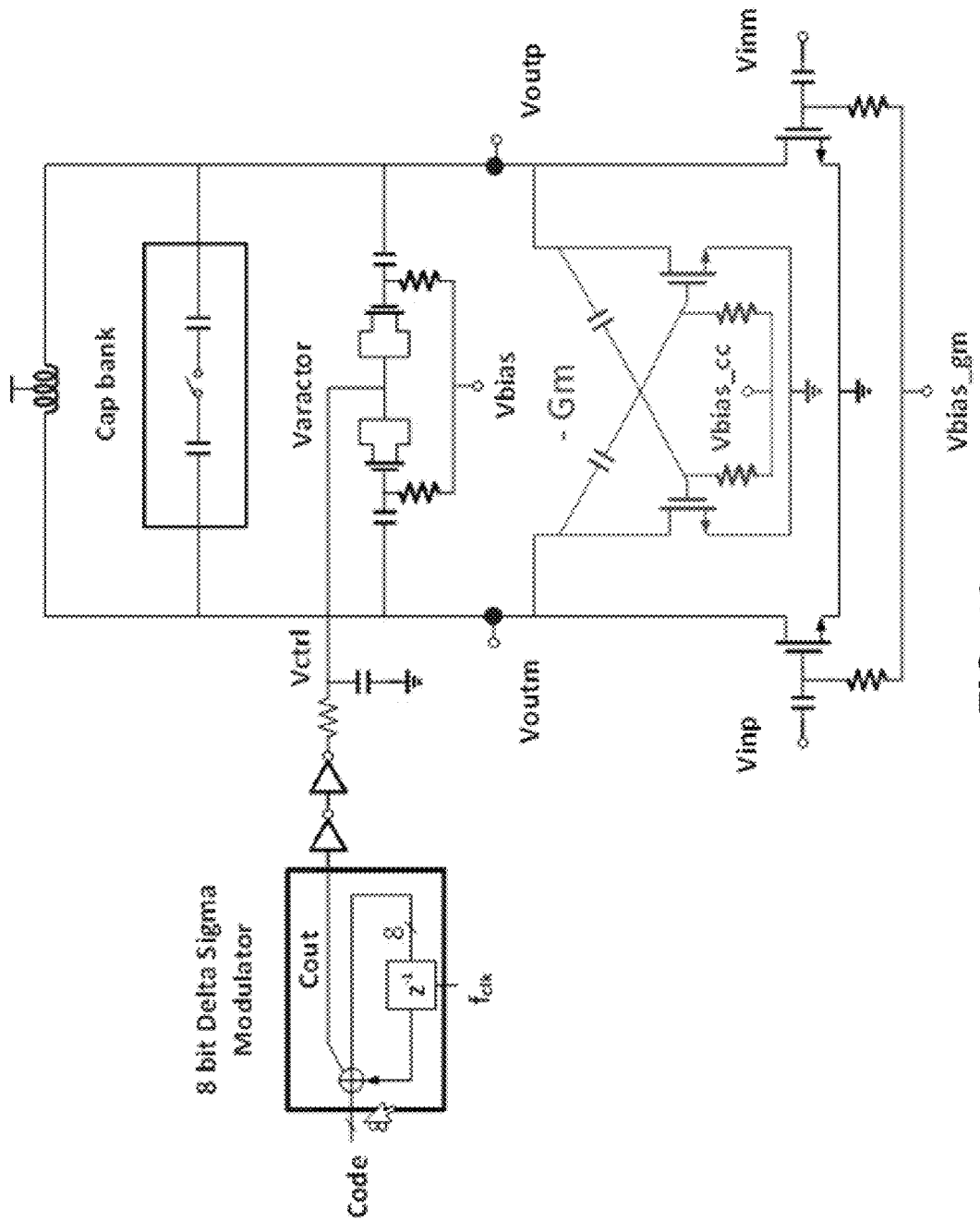
FIG. 12 shows a frequency tuning circuit in accordance with the present disclosure.

FIG. 12 illustrates a precise frequency tuning circuit of a Q-enhanced delay cell. The tuning circuit may include a combination of a capacitor bank and varactor controlled with 8-bit delta sigma modulator to tune the delay cell or other DAC topologies as would be understood by one of ordinary skill in the art.

The delay cell(s) 305 of the self-interference canceller 105 may be calibrated by accurately controlling the frequency tuning to achieve flat amplitude and group delay response by staggering the delay cells 305. The LC tanks of the Q-enhanced delay cells 305 are tuned using the capacitor bank and varactor controlled with the delta sigma modulator based DAC. The 8-bit adder is configured to act as an accumulator and its carry out bit serves as delta sigma modulator output with effective code density proportional to the code. This output is low pass filtered using an RC network and converted to DC voltage to control the varactor. The filtered output of the varactor has a clock spur of −79 dBc. The varactor enables a tuning resolution of 0.464 mV/LSB which translates to capacitor tuning resolution of 14 aF/LSB which is sufficient for precise control. Additionally or alternatively, other fine resolution DAC topologies may be used as would be understood by one of ordinary skill in the art.

A calibration process is described below with reference to FIGS. 14-17. This process can be used to precisely set the center frequency and Q of the delay cells 305 to facilitate the staggering of the delay cells 305 and achieve a flat wideband group delay with the necessary negative transconductance (gm) backoff to avoid or reduce oscillation.

Figure 13:
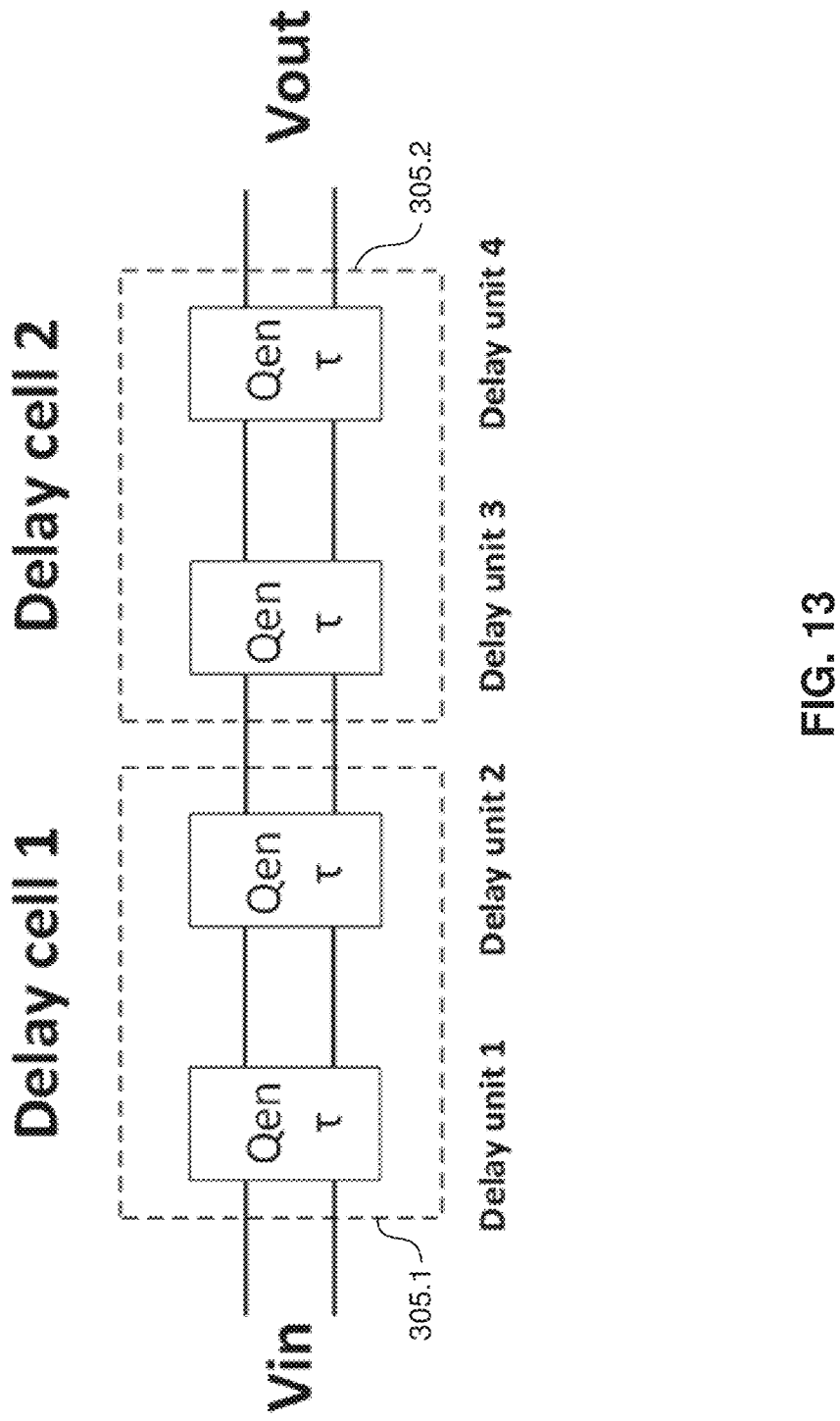
FIG. 13 shows staggered delay cells in accordance with the present disclosure.

As shown in FIG. 7, each delay cell 305 includes two staggered LC delay units (i.e. two staggered Q-enhanced LC tanks). As shown in FIG. 13, two delay cells 305 are staggered to synthesize wideband delay and amplitude response. This provides that the total FIR chain includes four Q-enhanced LC tank stages (i.e. four delay units). As shown in FIGS. 5A-5B, each LC tank delay unit has a gm stage for driving the LC tank and an additional negative gm stage to control the quality factor of the tank. FIG. 7 shows how staggering two delay units at frequency funit1 and funit2 to form a delay cell 305 can result in wideband group delay response (see FIG. 8). To provide for a flat group delay response, the center frequency and group delay of each unit is precisely calibrated.

Figure 14:
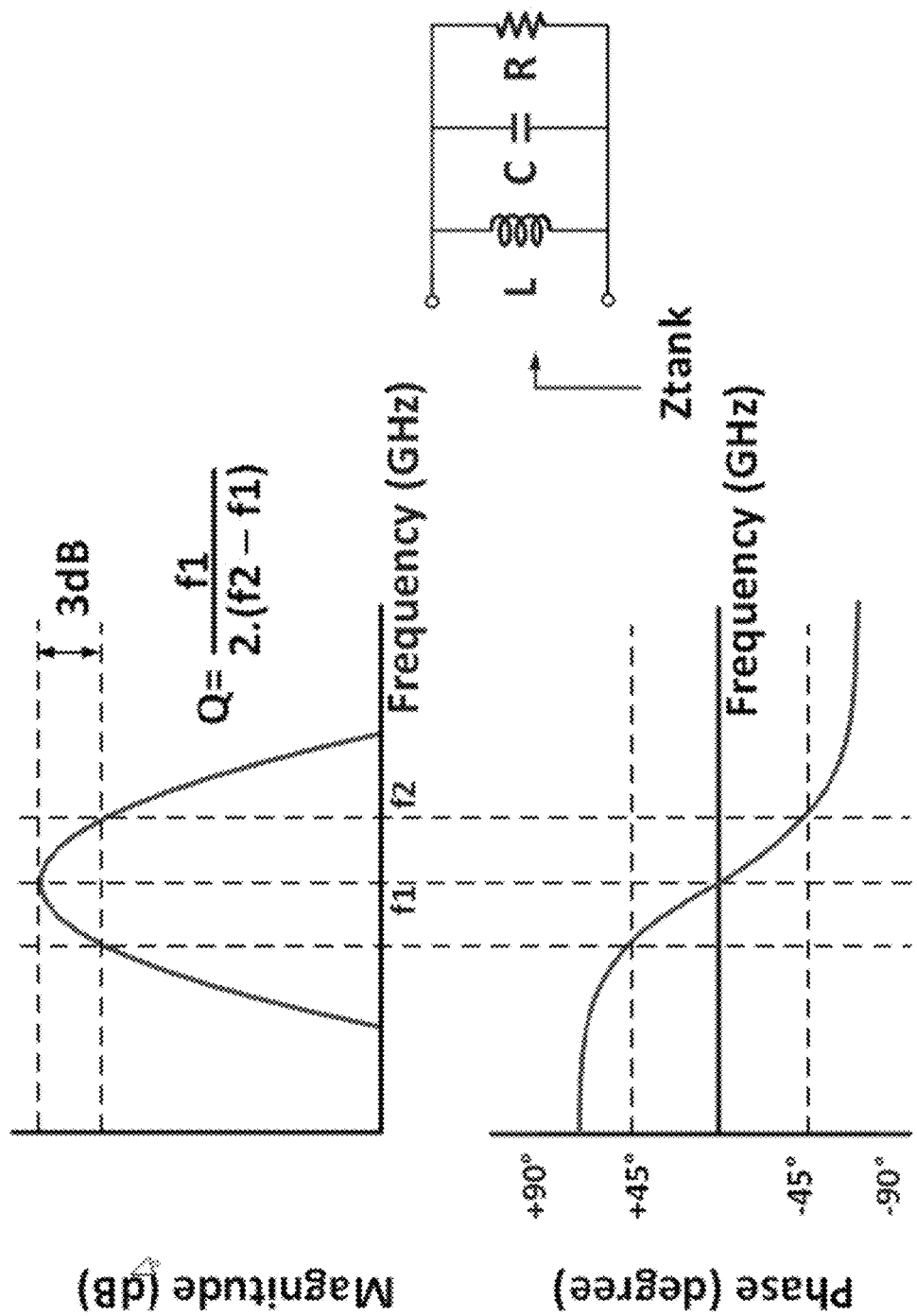
FIG. 14 shows plots of the frequency and phase shift characteristics of the LC tank delay unit in accordance with the present disclosure.

To calibrate the delay of the FIR chain, the quality factor of each delay unit is determined because the group delay is a function of the quality factor (Q): delay τ=2Q/ωo. Here, ωo=2π(f$_0$), where f$_0$ is the center frequency of the LC resonator. An LC tank at resonant frequency (f1) introduces 0 degree phase shift whereas at the frequency where the impedance magnitude is reduced by 3 dB (f2), introduces 45 degree phase shift as shown in FIG. 14. Here, f1 and f2 are precisely measured using circuit reconfiguration and frequency measurement technique and then Q of the stages are evaluated using the following equation 1:

$$Q = \frac{f1}{2(f2 - f1)} \quad (1)$$

Figure 15:
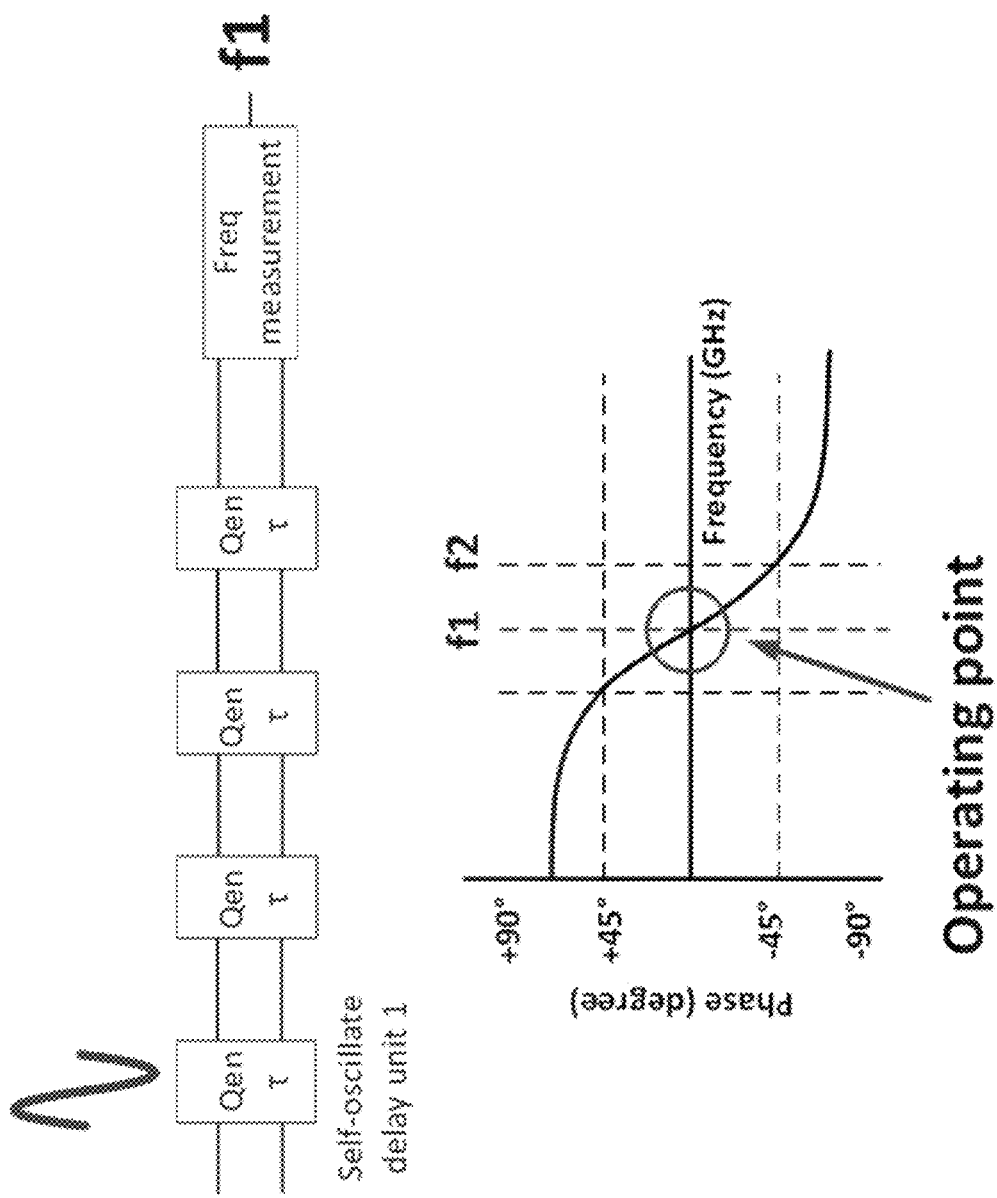
FIG. 15 shows a tuning configuration in accordance with the present disclosure.

The delay units are tuned to frequency f=f1=funit1 one at a time. The negative gm of a delay unit is increased until the delay unit starts to oscillate. The oscillation frequency is measured using a counter-based frequency measurement circuit. The capacitor bank is used to ensure that resonance occurs at f=f1. Thereafter, the negative gm of the delay unit is backed off to stop oscillation. This step is repeated for each of the delay units to respectively tune them at f=f1. Note that at f=f1, each delay unit (LC tank) introduces 0 degree phase shift. This step is illustrated in FIG. 15.

Figure 16:
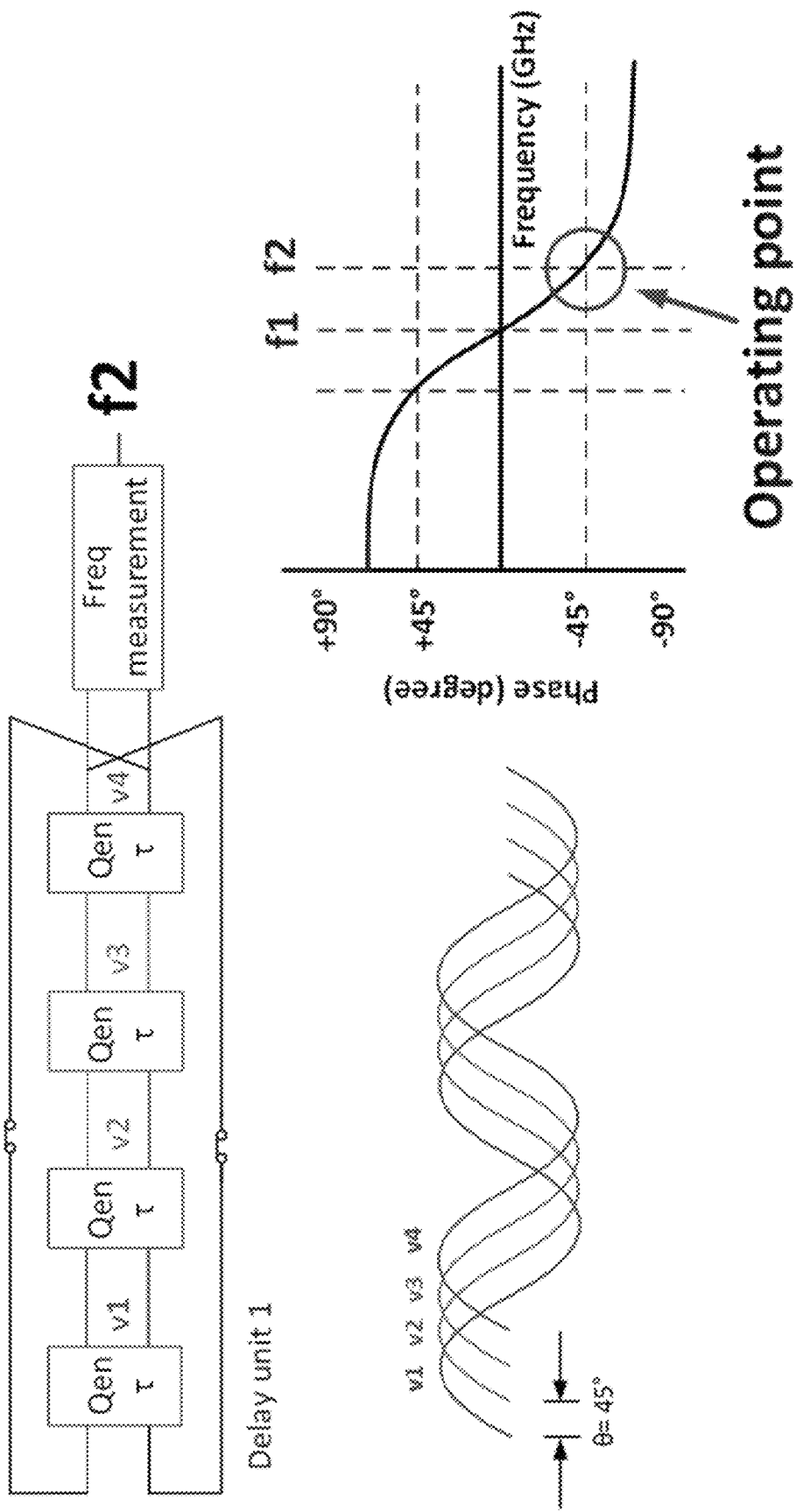
FIG. 16 shows a ring oscillator configuration in accordance with the present disclosure.

As shown in FIG. 16, the four LC delay units are connected to form a ring oscillator. In order to oscillate, each tank has to provide the phase shift necessary for Barkhausen criterion to be fulfilled. For four stages to oscillate, each tank has to introduce 45 degree phase shift such that total phase shift from four stages is 180 degree and one flipped connection provides the additional 180 degree resulting in total phase shift of 360 degrees in the loop. As a result, the ring oscillates at frequency f=f2, where each tank introduces 45 degree phase shift. Note that for an LC tank, this is also the −3 dB gain point. The Q of each stage is then determined using equation 1.

Figure 17:
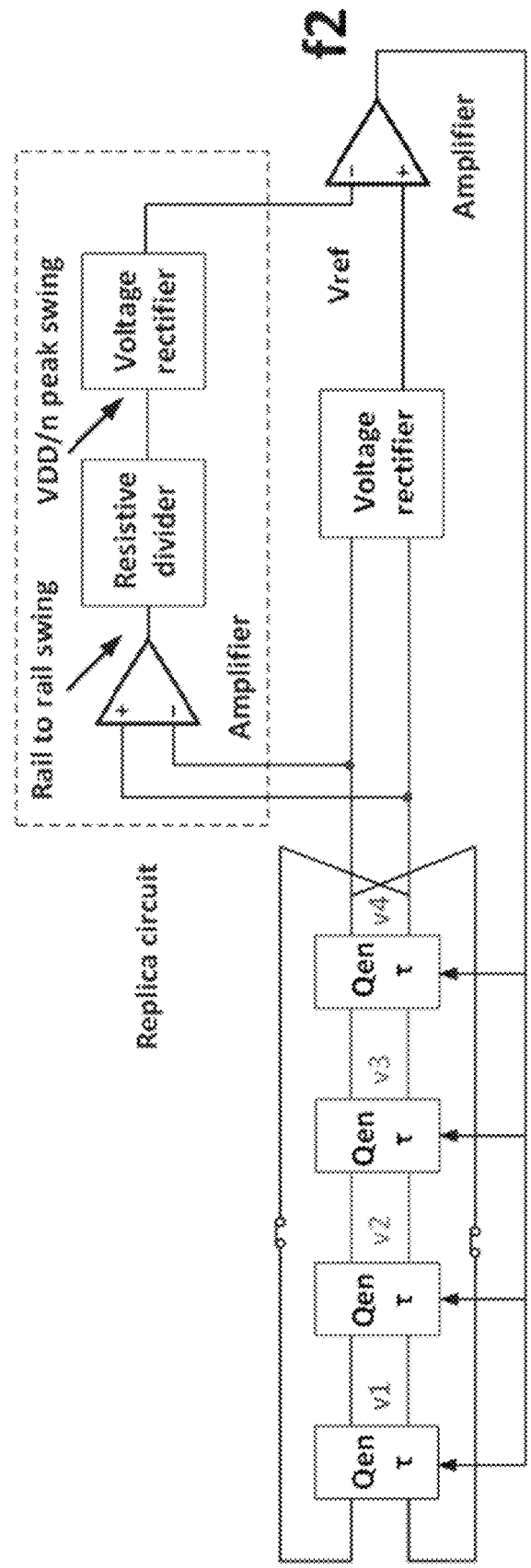
FIG. 17 shows an amplitude control loop in accordance with the present disclosure.

The exact Q of the delay cell is a function of the swing of the signal passing through the chain because the swing will dynamically modulate the drain impedances of the transistors in the gm cell and the cross-couple cell. Therefore, to measure the exact Q, an amplitude control loop as shown in FIG. 17 may be used, which current limits the gm stages and controls the swing such that it is exactly equal to the signal which will pass through the chain during the operation as RF canceller. The control loop may include a rectifier that is configured to sense the ring voltage swing and convert such voltage to an equivalent DC voltage. An error amplifier is configured to sense the DC voltage and compare it with a reference, and to control the tail current source of the gm cell forming a negative feedback loop thereby regulating the ring swing. The voltage reference may be generated using a replica circuit. The replica circuit amplifies the ring oscillator output to rail to rail signal, which is supplied to a resistive voltage divider. If the delay chain propagates a signal with VDD/n peak swing, the reconfigurable divider performs 1:n division. This signal is provided as an input to a replica rectifier that generated the DC reference equivalent for a sinusoid with VDD/n peak swing.

The Q of the delay units is then evaluated using Equation 1. The negative gm of the delay units are adjusted until the required Q, and hence the group delay, is obtained. The settings for the capacitor bank, gm cell, and negative gm may then be stored.

This process is then repeated for the second stagger frequency f=f1=funit2. The second settings are then stored. The first settings are then applied to stages 1 and 3. The second settings are then applied to stages 2 and 4 resulting in a delay chain with calibrated center frequency and group delay.

Figure 18:
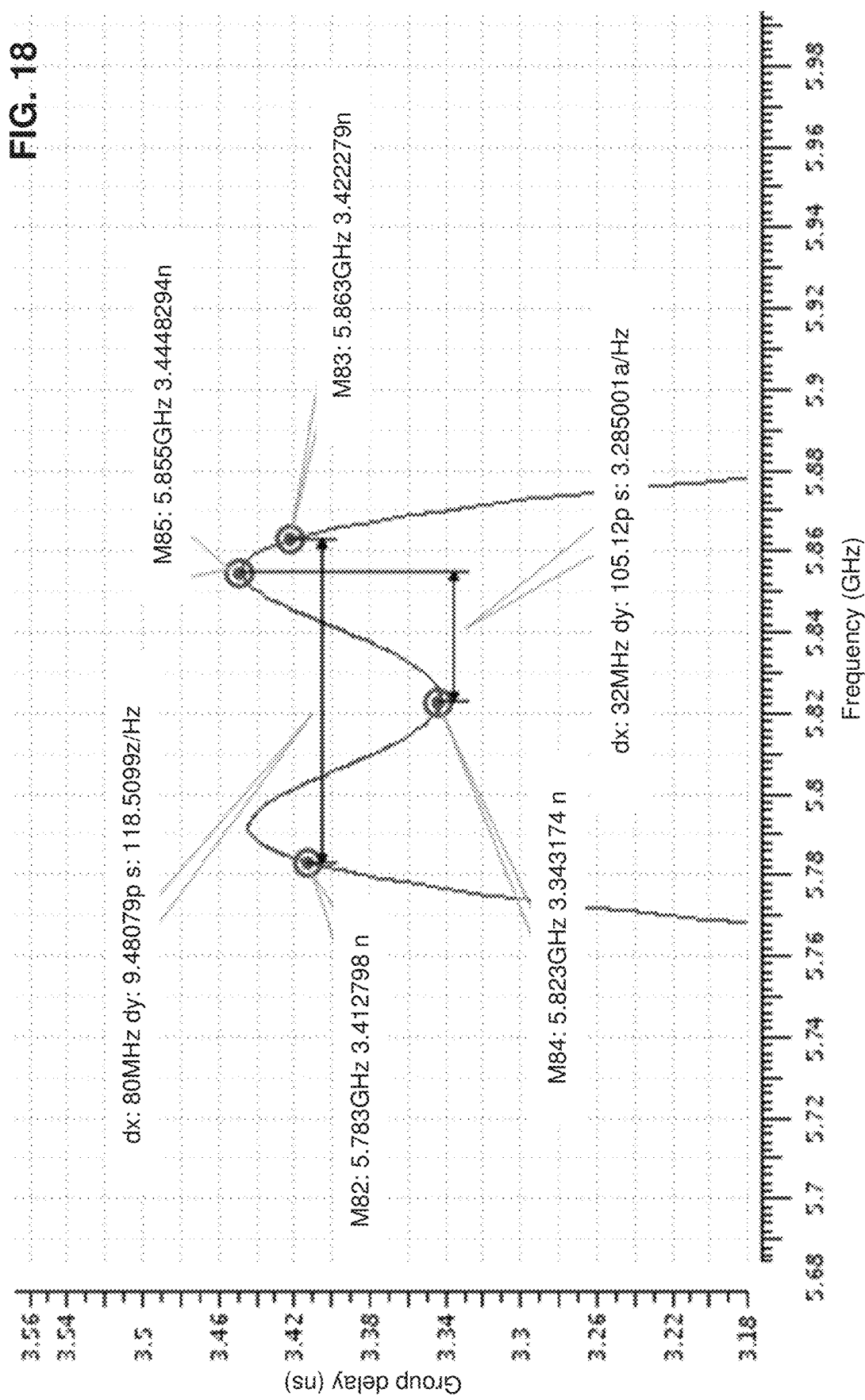
FIGS. 18-21 show plots of simulation results in accordance with the present disclosure.
Figure 19:
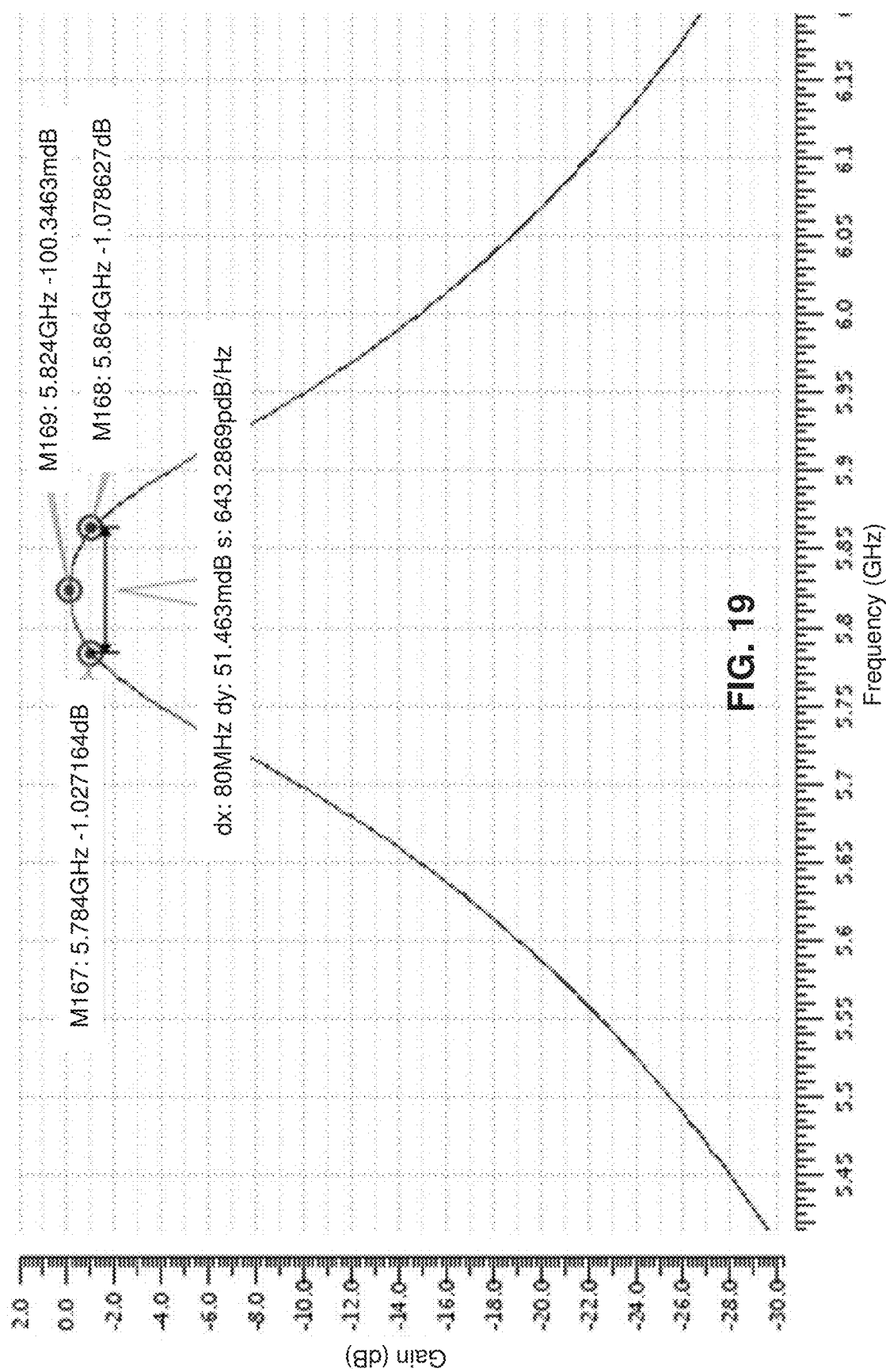
Figure 20:
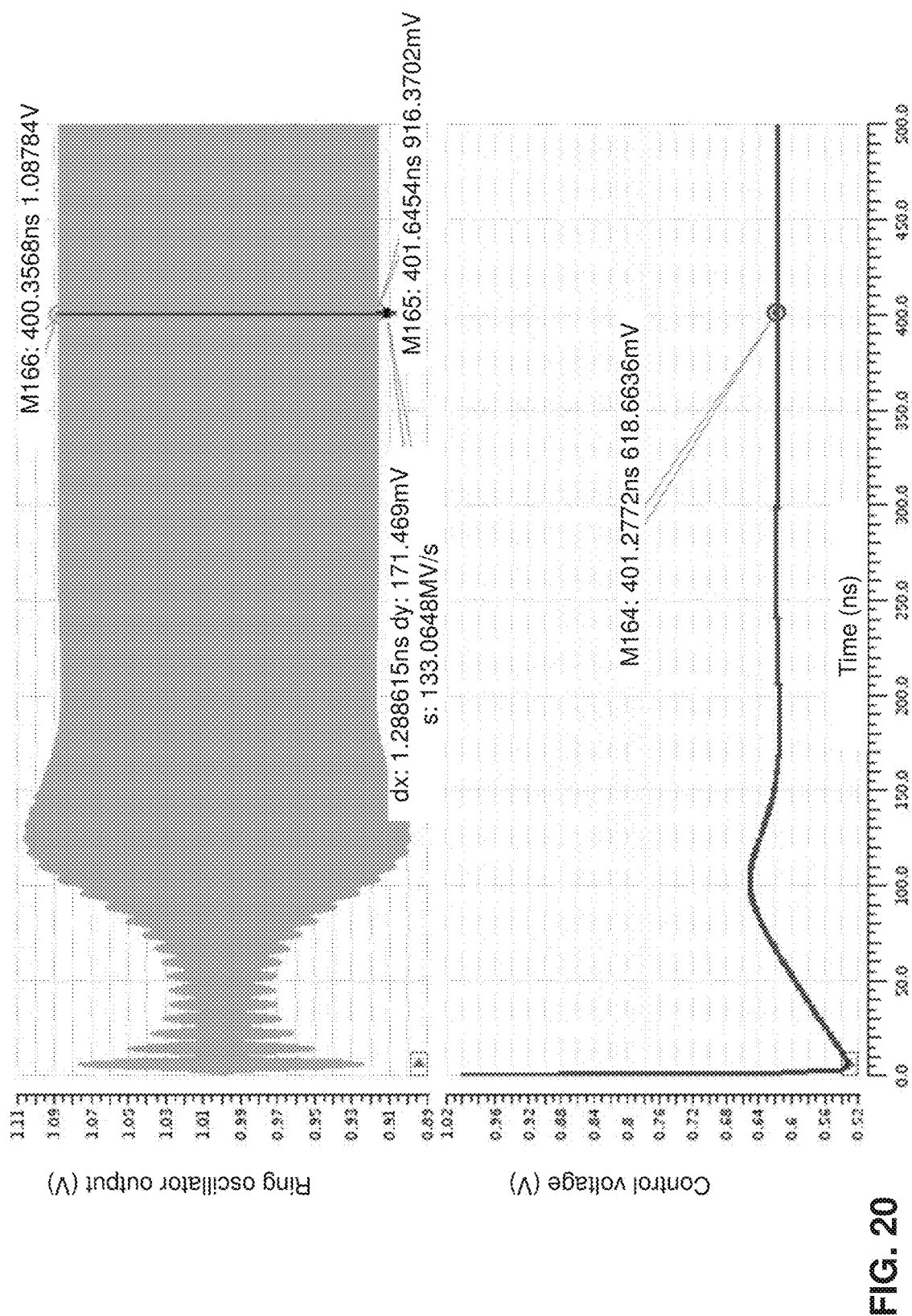
Figure 21:
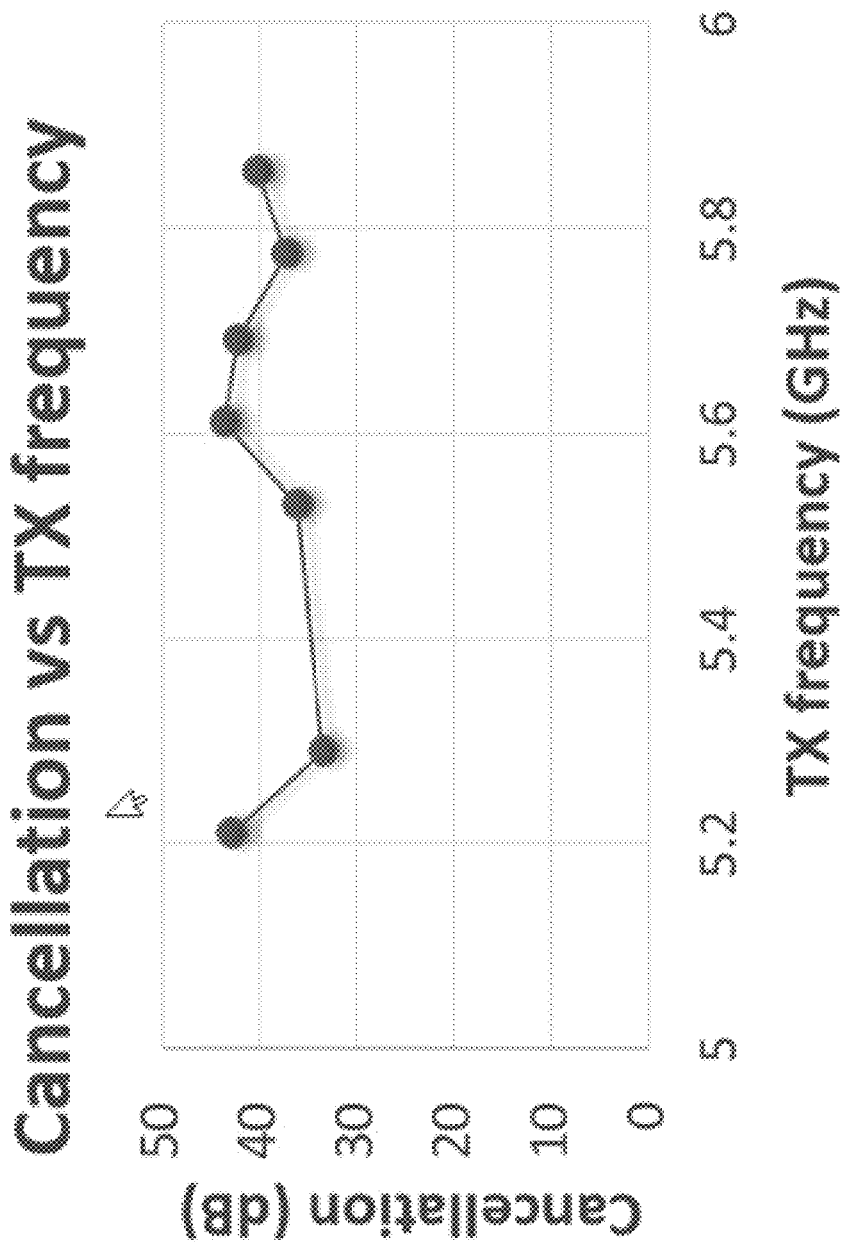

FIGS. 18-21 illustrate simulation results following calibration. The simulated group delay flatness is 105 ps across 80 MHz, as shown in FIG. 18, and gain flatness is 0.9 dB across 80 MHz, as shown in FIG. 19. FIG. 20 shows the settling of the ring oscillator output with regulated amplitude <100 mV and the settling of control voltage in the automatic amplitude control loop. FIG. 21 shows the cancellation (dB) vs TX frequency of a 3-tap complex FIR based canceller with unit delay of 4 ns. The FIR weights can be tuned using the LMS algorithm. The minimum cancellation achieved is 33.44 dB at 5.29 GHz and maximum cancellation achieved is 43.6 dB at 5.61 GHz.

Figure 22:
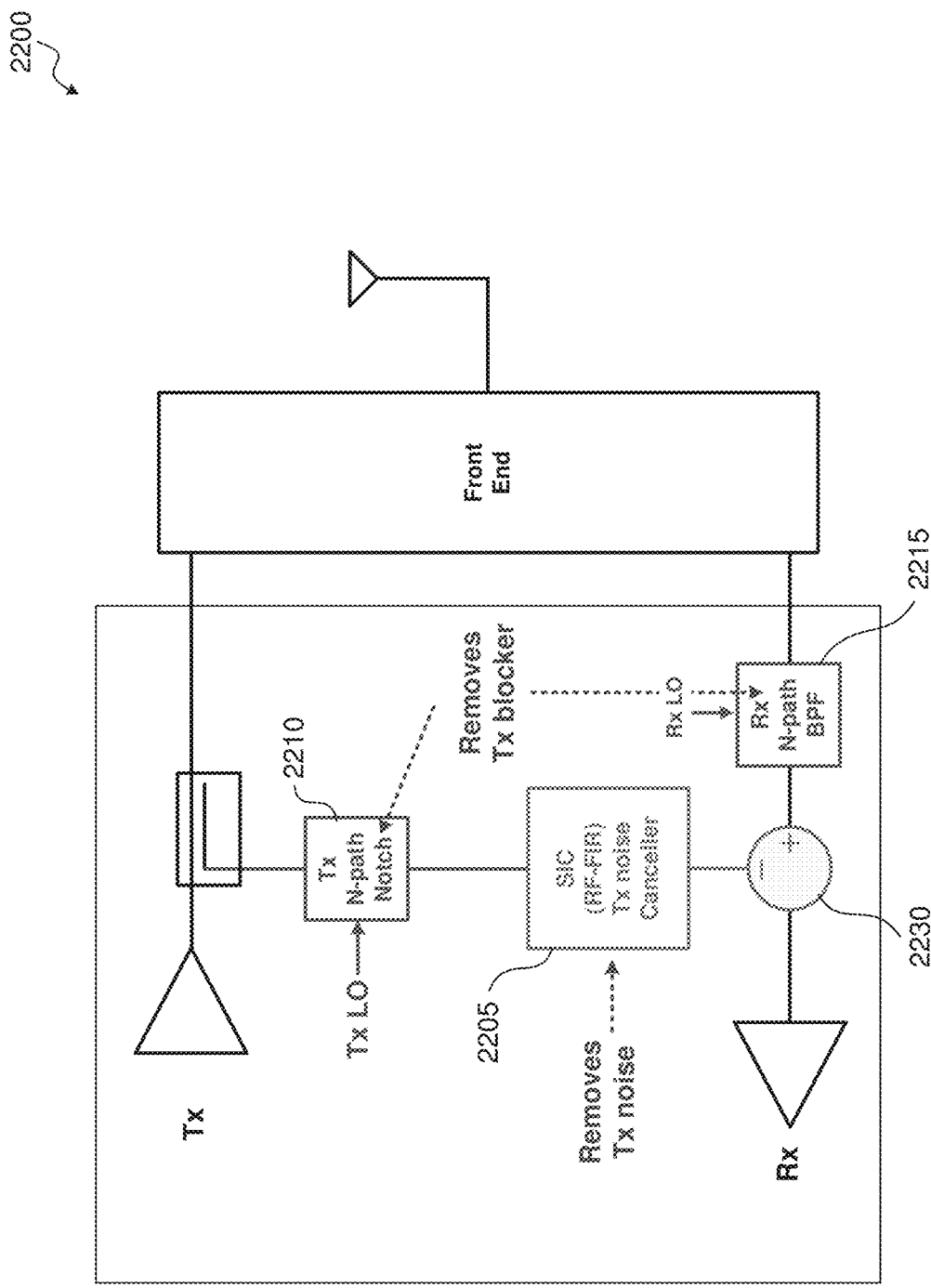
FIG. 22 shows a communication device in accordance with the present disclosure.

FIG. 22 illustrates a communication device 2200 according to the disclosure. As described above, there are two fundamental impairments that degrade receiver performance communication devices configured for simultaneous Transmitter-Receiver radio operation. One impairment is that the high power transmitter blocker leaks and de-senses the receiver (e.g. due to reciprocal mixing and other non-linear distortion effects). Another impairment is that transmitter noise in the receiver band may leak into the receiver. The communication device 2200 advantageously addresses these issues. The communication device 2200 utilizes an N-path band-pass filter (BPF) in the receiver to remove leaking Tx blocker in front of the receiver, and utilizes N-path Band-stop (Notch)/BPF on a sampled Tx signal and performs "Tx noise in Rx band" cancellation.

As shown in FIG. 22, the communication device 2200 includes a self-interference canceller 2205 that is configured to tap into the transmitted signal and generate a replica of the self-interference signal by mimicking the leakage channel response through the diplexer (frontend). This replica is subtracted from the signal at the receiver input (using adder/subtractor 2230) to achieve a cancellation signal at the receiver. The self-interference canceller 2205 is configured according to one or more configurations of the disclosure. For example, the self-interference canceller 2205 can include Q-enhanced delay cells as discussed above. This self-interference canceller 2205 is configured to compensate for Tx noise in Rx band by sampling the Tx signal at transmitter's output and generating a replica of the self-interference signal. That is, the self-interference canceller 2205 is configured to adapt the noise with respect to time delay, amplitude attenuation and phase shift.

In this tapped path, the communication device 2200 further includes an N-path Band-stop (Notch) filter 2210 that is configured to remove the Tx blocker signal from the tapped transmitter signal that is provided to the self-interference canceller 2205. That is, the N-path Band-stop (Notch) filter 2210 at the coupled Tx output removes the Tx signal power and passes only the Tx out-of-channel noise towards Rx for noise cancellation via the self-interference canceller 2205.

The receiver path also includes an N-path band-pass filter (BPF) 2215 that is provided at the receiver input. This filter 2215 is configured to remove the leaking Tx blocker that is leaked through the diplexer (frontend) into the receiver.

The communication device 2200 advantageously enables higher throughput, lower latency and lower total solution cost. For example, the aspects of the communication device 200 can be fully integrated in silicon, is configurable vs BW and Tx/Rx RF channel combinations, is a complete solution that addresses both Tx blocker and Tx noise without Tx KPI degradation, and reduces RF front-end filter/diplexer requirements (cost, size and insertion loss).

Figure 23A:
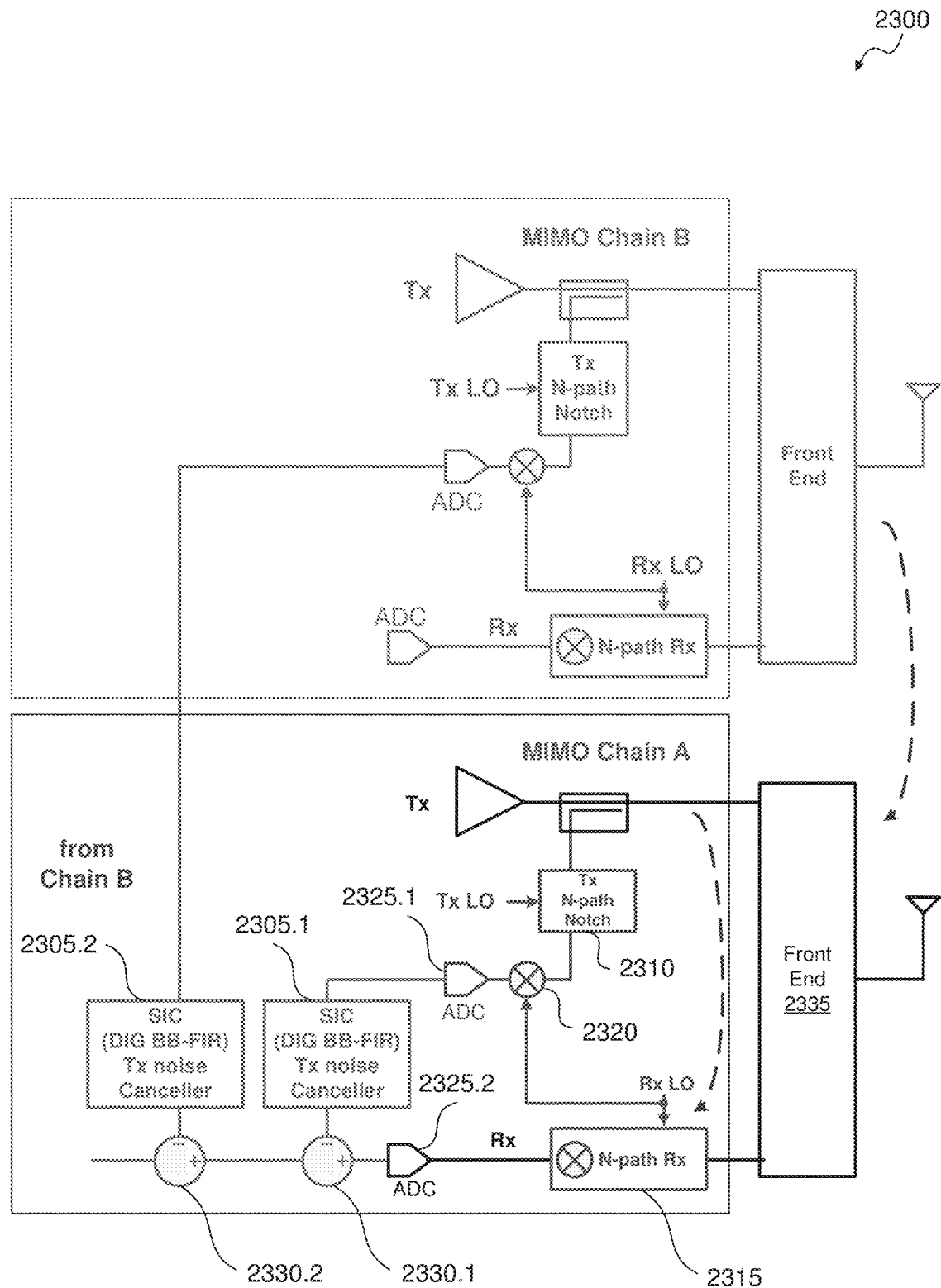
FIG. 23A shows a communication device in accordance with the present disclosure.

FIG. 23A illustrates a communication device 2300 according to the disclosure. The communication device 2300 includes a receiver architecture to remove Tx blocker leakage in a Frequency division duplex (FDD) configuration. This configuration also supports Multiple Input Multiple Output (MIMO) operations. In this case, the "Chain B" may include identical components as shown for the illustrated transmitter path (e.g. a second N-path Notch filter feeding into the second self-interference canceller 2305.2 of "Chain A" and a second N-path filter in the receiver of "Chain B").

The communication device includes an N-path Band-stop (Notch) filter 2310 coupled at the transmitter output, which is configured to remove the Tx signal power (e.g. Tx blocker signal) and pass only the transmitter out-of-channel noise towards the receiver for noise cancellation via the self-interference canceller 2305.1. The Tx out-of-channel noise is down-converted to baseband by the mixer 2320 using the Rx local oscillator (Rx LO), and converted to the digital domain by the ADC 2325.1, before being provided to the self-interference canceller 2305.1. In this configuration, the self-interference canceller 2305.1 compensates for delay, phase, and/or amplitude differences between the Tx noise provided to the self-interference canceller 2305.1 via the filter 2310 and the Tx noise that has leaked through the diplexer (frontend 2335) into the receiver. The Tx noise via the filter 2310 is then subtracted from the output signal of the N-path filter 2315 by adder/subtractor 2330.1. The self-interference canceller 2305.2 is coupled to Chain B (e.g. the N-path Band-stop (Notch) filter coupled at the transmitter output of Chain B) to remove the Tx noise from the Chain B that may leak to the frontend 2335.

The self-interference cancellers 2305.1 and 2305.2 are similar to the self-interference canceller 2205, and are configured to generate a replica of the self-interference signal by mimicking the leakage channel response through their associated diplexer (frontend). In this configuration, the self-interference cancellers 2305 are digital self-interference cancellers (e.g. a digital implementation of the channel) while the canceller 2205 is an RF canceller (e.g. RF implementation of the channel). The self-interference canceller 2305 may be configured according to one or more configurations of the disclosure. For example, the self-interference canceller 2305 is a digital self-interference canceller that is configured to adapt the noise with respect to time delay, amplitude attenuation and phase shift.

The communication device 2300 may further include a N-path filter 2315 that is configured to down-convert and sample the "Tx noise in Rx band" signal and reject the Tx blocker that may leak through the diplexer (frontend 2335) into the receiver. The N-path filter 2315 is configured to both down-convert and filter the signal received from the frontend. The compensated signal generated by the self-interference canceller 2305 is then subtracted from the output signal of the N-path filter 2315. As discussed above, the Chain B may include an identical N-path filter in its receiver. The N-path filter 2315 (and/or the N-path filter of Chain B) may be a "mixer-first" N-path filter, but is not limited thereto.

Figure 23B:
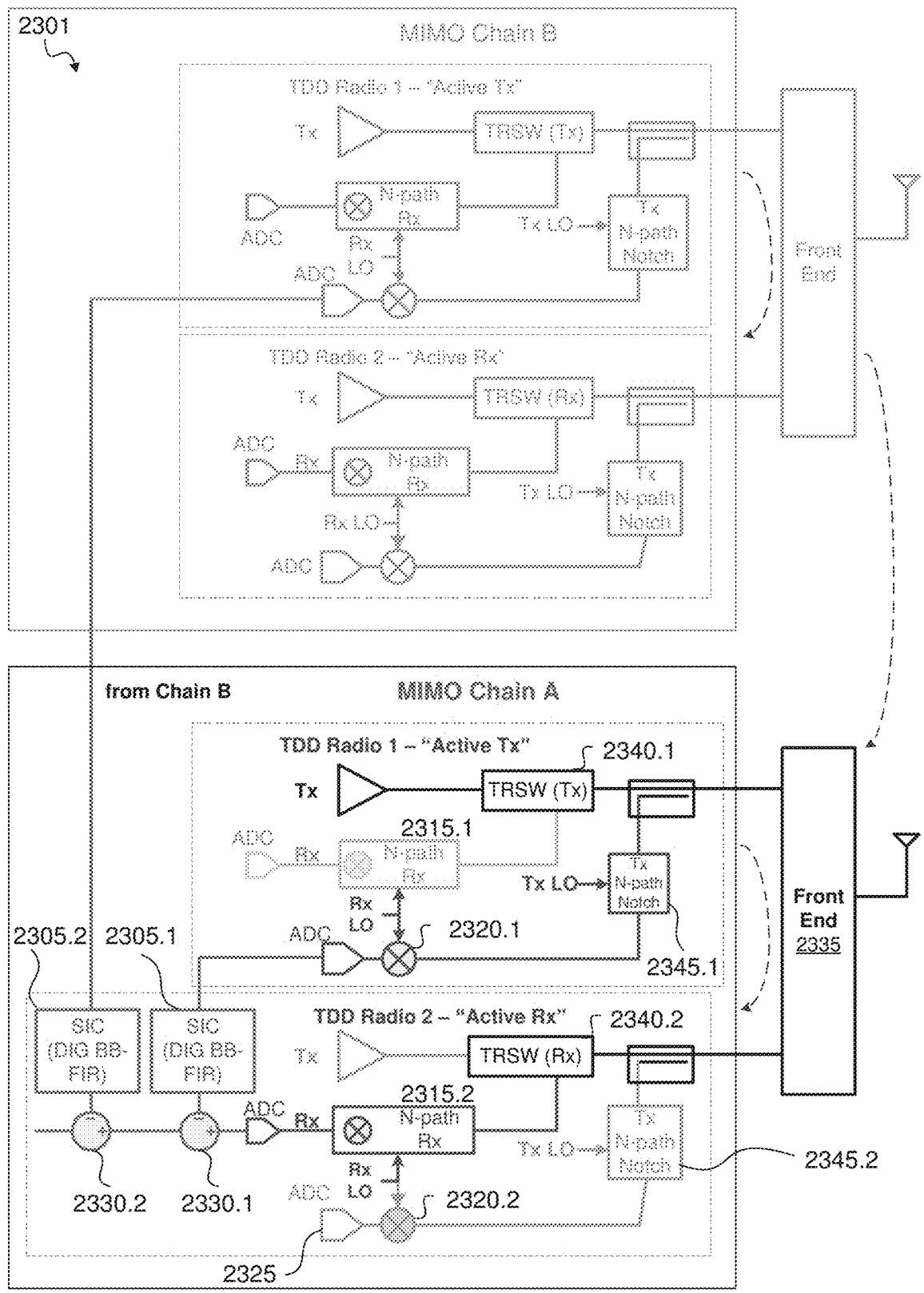
FIG. 23B shows a communication device in accordance with the present disclosure.

FIG. 23B illustrates a communication device 2301 according to the disclosure. The communication device 2301 is similar to the communication device 2300 but includes a receiver architecture to remove Tx blocker leakage in a time division duplex (TDD) configuration. This configuration also supports MIMO operations. In this case, the "Chain B" may include identical components as shown for the illustrated transmitter path (e.g. a second N-path Notch filter feeding into the second self-interference canceller 2305.2 of "Chain A" and a second N-path filter in the receiver of "Chain B").

For TTD operations, each Chain includes two radios, where one of the radios is configured in an active transmit mode while the other radio is configured in an active receive mode. Each of the radios further includes Transmit-Receive switches (TRSW) 2340 that selectively couple the N-path filter 2315 of the receive path to the frontend 2335.

As shown in FIG. 23B, the TRSW 2340.1 of TDD Radio 1 is in the Tx mode while the TRSW 2340.2 is in the Rx mode. In this configuration, the N-path Band-stop (Notch) filter 2345.1 is coupled at the transmitter output of Radio 1, which is configured to remove the Tx signal power and pass only the transmitter out-of-channel noise towards the receiver for noise cancellation via the self-interference canceller 2305.1. The Tx out-of-channel noise is down-converted to baseband by the mixer 2320.1 using the Rx local oscillator (Rx LO), and converted to the digital domain by the ADC, before being provided to the self-interference canceller 2305.1. The N-path receiver 2315.2 is coupled to the frontend via TRSW 2340.2 and is configured to down-convert and sample the "Tx noise in Rx band" signal. The N-path receiver 2315.2 may both down-convert and filter the signal received from the frontend. The compensated signal generated by the self-interference canceller 2305.1 is then subtracted from the output signal of the N-path receiver 2315.2 by adder/subtractor 2330.1. In this configuration, the self-interference canceller 2305.1 removes the leaking Tx noise that is leaked through the diplexer (frontend 2335) into the receiver. The self-interference canceller 2305.2 is coupled to Chain B (e.g. the N-path Band-stop (Notch) filter coupled at the transmitter output of Chain B) to remove the Tx noise from the Chain B that may leak to the frontend 2335. The N-path receiver 2315 (and/or the N-path receiver of Chain B) may be a "mixer-first" N-path receiver, but is not limited thereto.

Figure 24A:
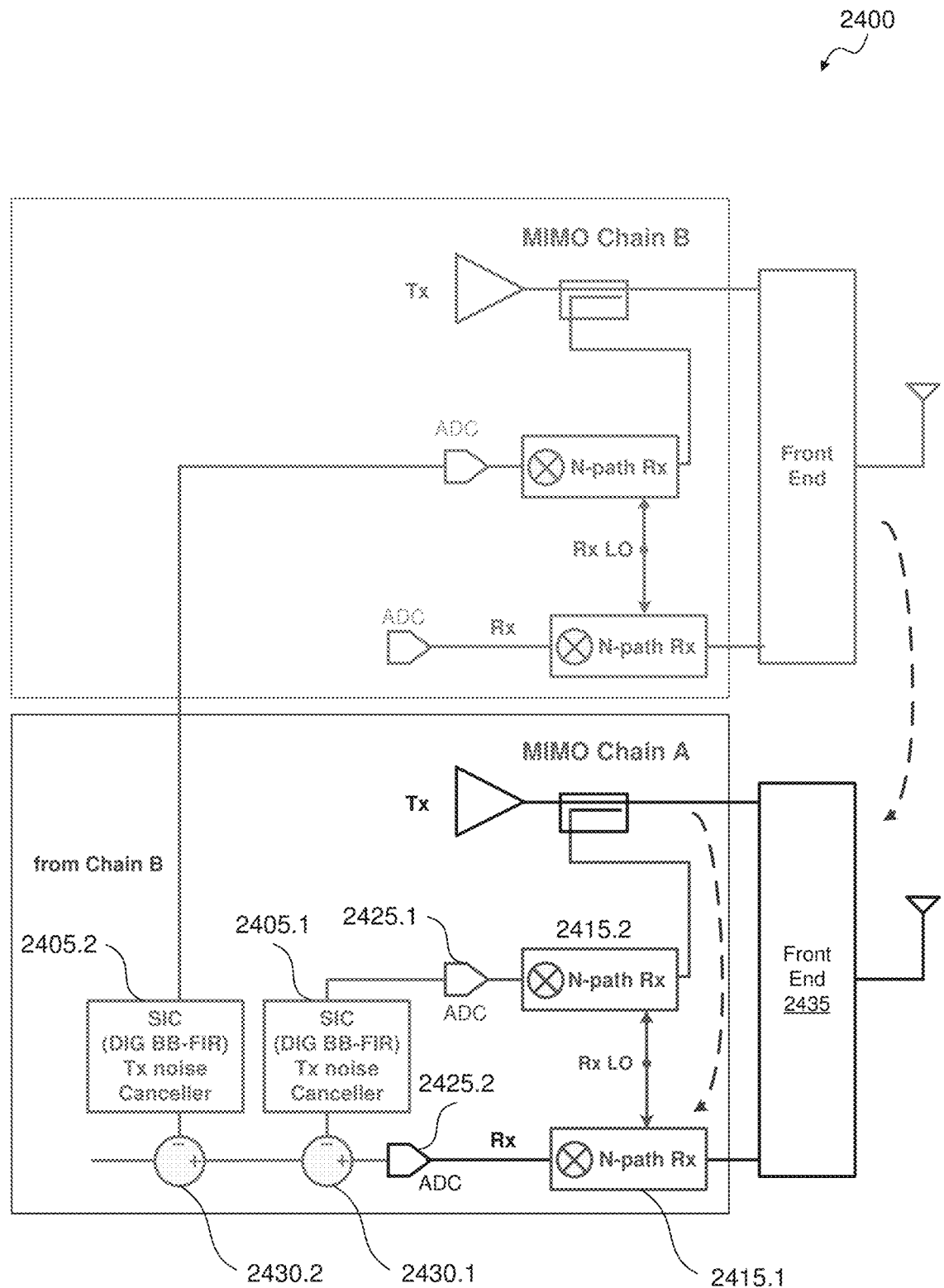
FIG. 24A shows a communication device in accordance with the present disclosure.

FIG. 24A illustrates a communication device 2400 according to the disclosure. The communication device 2400 is similar to the communication device 2300 and also configured for FDD MIMO operation, but an additional N-path receiver 2415.2 is used instead of the N-path Band-stop (Notch) filter. The output of the N-path receiver 2415.2 is provided to self-interference canceller 2405.1, which is configured to generate a replica of the self-interference signal by mimicking the leakage channel response through the diplexer (frontend). The self-interference canceller 2405.1 is configured according to one or more configurations discussed above. The self-interference canceller 2405.1 is a digital self-interference canceller that is configured to adapt the noise with respect to time delay, amplitude attenuation and phase shift.

The N-path receiver 2415.2 may be identically configured as the N-path receiver 2415.1 in the receiver path. With this configuration, a clean sampling of the transmitter noise signal as in main Rx is performed but without the Rx signal. That is, the Rx signal exists at the N-path receiver 2415.1 within the Rx path, while the N-path receiver 2415.2 does not have the Rx signal and only includes the Tx signal. This configuration also supports Multiple Input Multiple Output (MIMO) operations. In this case, the "Chain B" would include identical components as shown for the illustrated transmitter path (e.g. a second N-path filter feeding into the second self-interference canceller 2405.2). One or more of the N-path receivers 2415 may be a "mixer-first" N-path receiver, but is not limited thereto.

Figure 24B:
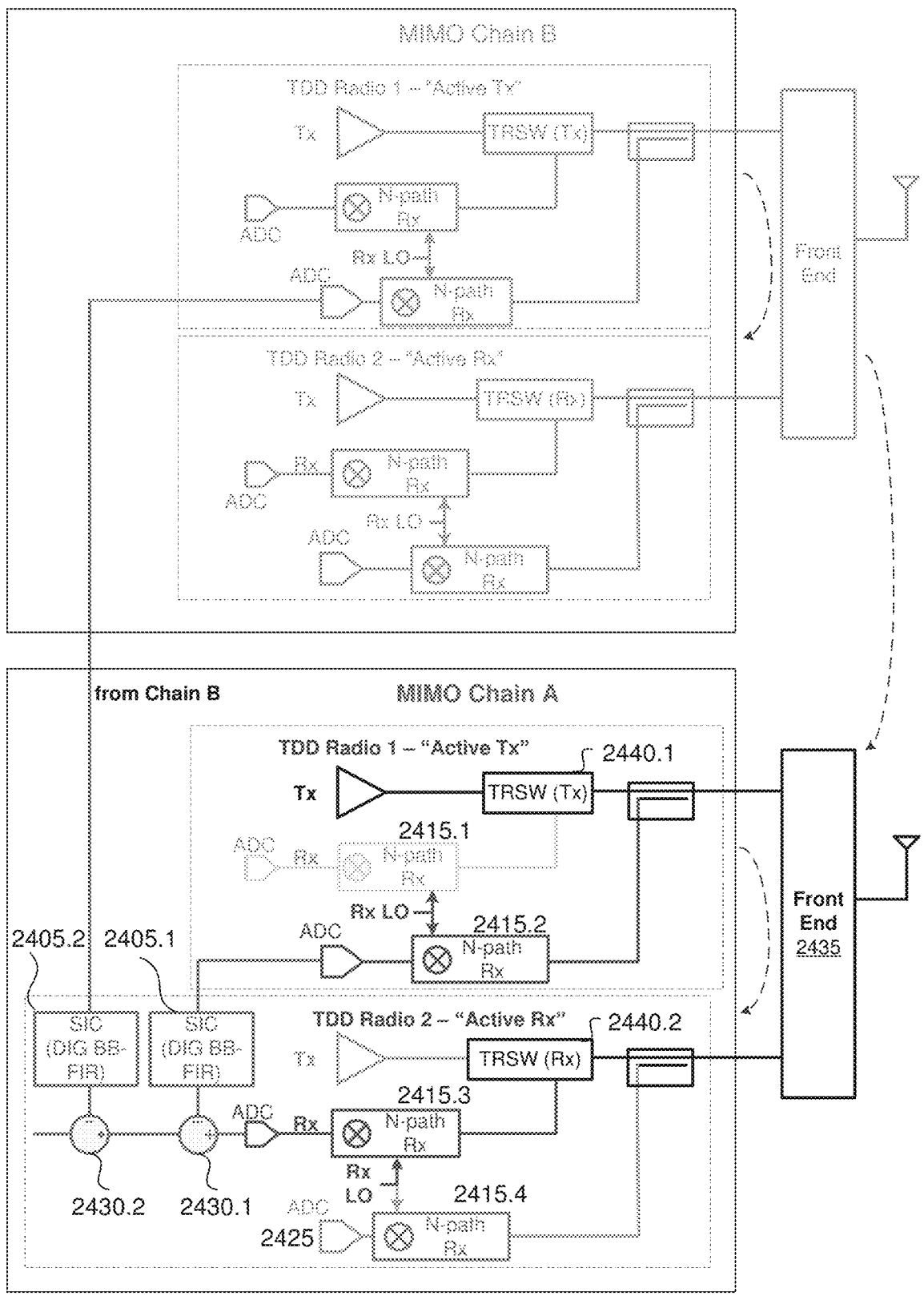
FIG. 24B shows a communication device in accordance with the present disclosure.

FIG. 24B illustrates a communication device 2401 according to the disclosure. The communication device 2401 is similar to the communication device 2301 and also configured for TDD MIMO operation, but an additional N-path receiver 2415.2 is used instead of the N-path Band-stop (Notch) filter.

As shown in FIG. 24B, the TRSW 2440.1 of TDD Radio 1 is in the Tx mode while the TRSW 2440.2 is in the Rx mode. In this configuration, the N-path receiver 2415.1 is coupled at the transmitter output of Radio 1, which is configured to remove the Tx signal power and pass only the transmitter out-of-channel noise towards the receiver for noise cancellation via the self-interference canceller 2405.1. The Tx out-of-channel noise is down-converted to baseband using the Rx local oscillator (Rx LO), and converted to the digital domain by the ADC, before being provided to the self-interference canceller 2405.1. The N-path receiver 2415.3 is coupled to the frontend via TRSW 2440.2 and is configured to filter and down-convert and sample the "Tx noise in Rx band" signal received from the frontend. The compensated signal generated by the self-interference canceller 2405.1 is then subtracted from the output signal of the N-path receiver 2415.3 by adder/subtractor 2430.1. In this configuration, the self-interference canceller 2405.1 removes the leaking Tx noise that is leaked through the diplexer (frontend 2335) into the receiver. The self-interference canceller 2405.2 is coupled to Chain B (e.g. the N-path filter coupled at the transmitter output of Chain B) to remove the Tx signal from the Chain B that may leak to the frontend 2335. One or more of the N-path receivers 2415 may be a "mixer-first" N-path receiver, but is not limited thereto.

Figure 25:
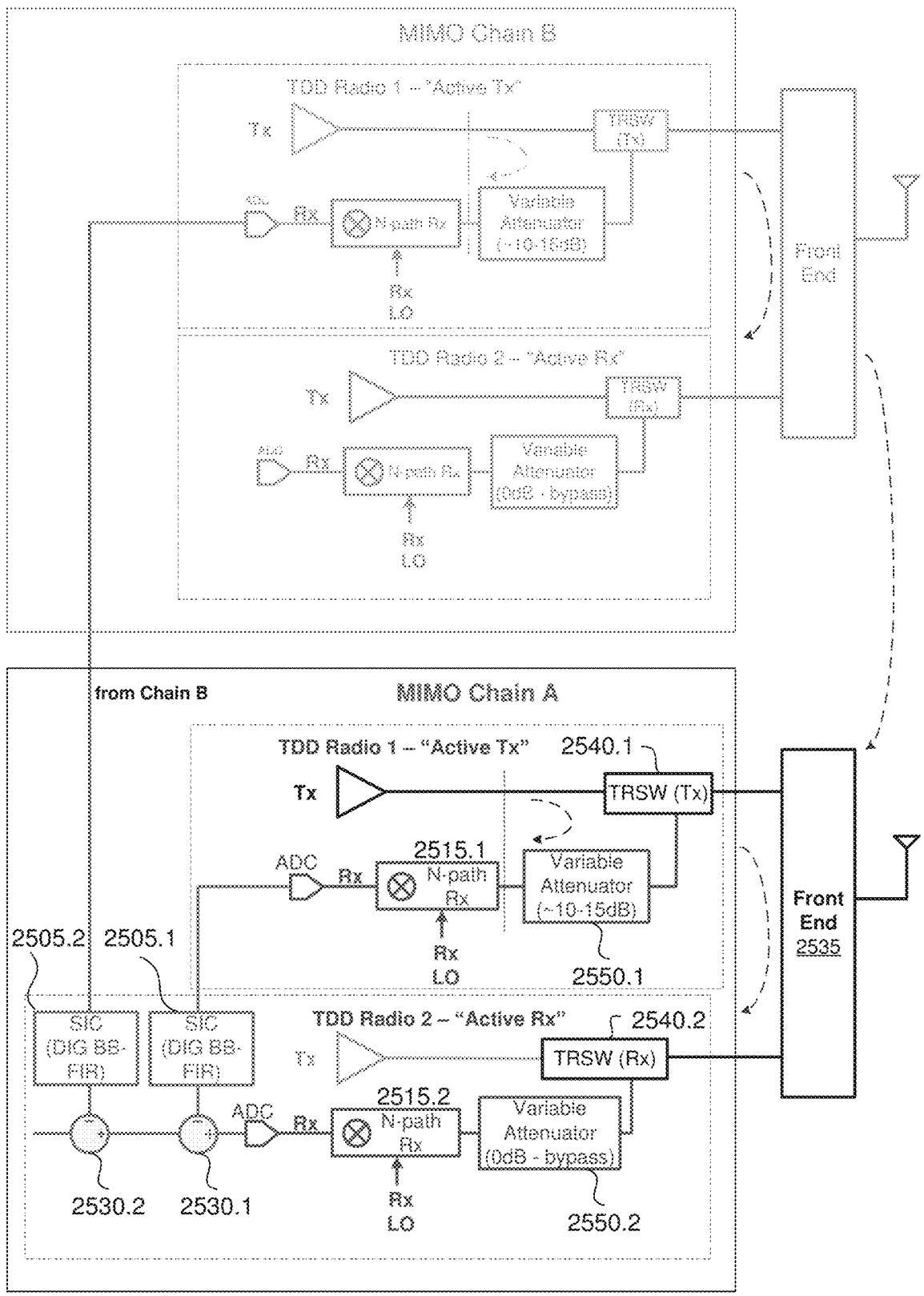
FIG. 25 shows a communication device in accordance with the present disclosure.

FIG. 25 illustrates a communication device 2500 according to the disclosure. The communication device 2500 is similar to the communication devices 2400, 2401 but leverages the fact that Transmitting radio (radio 1 in FIG. 25) may have a receiver that is turned off during the transmission. Such a scheme exists in TDD radios, such as Wi-Fi or Bluetooth. In this example, the radios each include a TRSW 2540, and a variable attenuator 2550. Using the leakage through the TRSW 2540.1 with the variable attenuator 2550.1, the communication device 2500 allows sampling of the "Tx noise in Rx band" without a dedicated coupler and receiver (i.e. the existing receiver in Radio 1 is used). The variable attenuator 2550.1 is configured to match the total coupling loss to be approximately 10 dB lower than the Frontend isolation path loss (e.g. only approximately 0.5 dB noise added in the simultaneous Tx-Rx mode).

The "Radio 1" includes N-path receiver 2515.1 that is configured to reject (filter out) the Tx blocker to generate a signal corresponding to the transmitter noise signal. This noise signal is then provided to self-interference canceller 2505.1 (of Radio 2), which is configured to generate a replica of the self-interference signal by mimicking the leakage channel response through the diplexer (frontend 2535). The self-interference canceller 2505.1 is configured according to one or more configurations discussed above. The self-interference canceller 2505.1 may be a digital self-interference canceller that is configured to adapt the noise with respect to time delay, amplitude attenuation and phase shift.

The receiver path of Radio 2 is similarly configured and includes transit/receive switch (TRSW) 2540.2, a variable attenuator 2550.2, and N-path receiver 2515.2. In the operation illustrated in FIG. 25, the TRSW 2520.2 is operating in the Rx mode, while the TRSW 2520.1 is operating in the Tx mode. One or more of the N-path receiver 2515 may be a "mixer-first" N-path receiver, but is not limited thereto.

This configuration also supports Multiple Input Multiple Output (MIMO) operations. As is illustrated in FIG. 25, the "Chain B" includes identical components as shown for the illustrated Radio 1.

The communication device 2500 may advantageously utilizes the existing circuits and the only Silicon adder is an additional PLL working at Rx LO (Radio 2 Rx frequency) in Radio 1.

The filters and cancellers as described herein can be used to prevent or reduce the transmitting channel from blocking or hindering the capability of the receiver chain from receiving the target signal.

EXAMPLES

The following examples pertain to various techniques of the present disclosure.

An example (e.g. example 1) relates to transceiver. The transceiver includes a transmit path and a receive path, each of which being coupled to a radio frequency (RF) interface; and a self-interference canceller (SIC) coupled between the transmit and receive paths and configured to cancel a self-interference signal from a received signal on the receive path based on a transmit signal on the transmit path.

Another example (e.g. example 2) relates to a previously-described example (e.g. example 1), wherein the SIC is configured to generate a replica signal of the self-interference signal to cancel the self-interference signal from the received signal.

Another example (e.g. example 3) relates to a previously-described example (e.g. example 2), wherein the SIC is configured to mimic a channel response through the RF interface to generate the replica signal.

Another example (e.g. example 4) relates to a previously-described example (e.g. example 3), wherein the SIC has an adjustable delay to mimic the channel response through the RF interface.

Another example (e.g. example 5) relates to a previously-described example (e.g. one or more of examples 1-4), wherein the SIC has an adjustable transconductance to adjust a delay of the SIC.

Another example (e.g. example 6) relates to a previously-described example (e.g. one or more of examples 1-5), wherein the SIC includes at least one LC tank delay circuit configured to adjust a delay of the SIC.

Another example (e.g. example 7) relates to a previously-described example (e.g. example 6), wherein the LC tank delay circuit includes a cross coupling configured to adjust a negative transconductance quality factor of the LC tank delay circuit to adjust the delay of the SIC.

Another example (e.g. example 8) relates to a previously-described example (e.g. example 7), wherein the cross coupling is configured to increase a negative transconductance of the LC tank delay circuit to adjust the quality factor.

Another example (e.g. example 9) relates to a previously-described example (e.g. one or more of examples 1-8), wherein the SIC comprises a delay cell that includes two LC tank delay circuits in a staggered connection, the delay cell being configured to adjust a delay of the SIC to mimic a channel response through the RF interface.

Another example (e.g. example 10) relates to a previously-described example (e.g. one or more of examples 1-8), wherein the SIC comprises two delay cells coupled together, each of the two delay cells including two LC tank delay circuits in a staggered connection, wherein a quality factor of each of the two delay cells is adjustable to adjust a delay of the SIC to mimic a channel response through the RF interface.

Another example (e.g. example 11) relates to a previously-described example (e.g. one or more of examples 6-10), wherein the LC tank delay circuits have an adjustable center frequency and quality factor, an adjustment of a respective center frequency and quality factor including: an increase in a negative transconductance of each of the LC tank delay circuits to produce self-oscillation so as to measure and tune each LC tank resonance frequency of the LC tank delay circuits; and with the LC tank delay circuits configured in a ring oscillator arrangement, a measurement of a ring oscillation frequency and a tuning of the negative transconductance to achieve a desired quality factor.

Another example (e.g. example 12) relates to a previously-described example (e.g. one or more of examples 1-11), further comprising an N-path filter coupled to the transmit path and between the SIC and the transmit path, the N-path filter being configured to filter out a transmit blocker signal from a transmit signal on the transmit path to generate a transmission noise signal, wherein the SIC is configured to: generate a replica signal of the self-interference signal based on the transmission noise signal, and cancel the self-interference signal from the received signal based on the replica signal.

Another example (e.g. example 13) relates to a previously-described example (e.g. example 12), further comprising an N-path filter in the receive path and configured to filter out the transmit blocker signal from the receive path.

Another example (e.g. example 14) relates to a previously-described example (e.g. one or more of examples 12-13), wherein the N-path filter coupled to the transmit path is an N-path notch filter.

Another example (e.g. example 15) relates to a previously-described example (e.g. one or more of examples 13-14), wherein the N-path filter in the receive path is an N-path bandpass filter.

Another example (e.g. example 16) relates to a previously-described example (e.g. one or more of examples 13-14), wherein the N-path filter in the receive path is a mixer-first N-path filter.

Another example (e.g. example 17) relates to a previously-described example (e.g. one or more of examples 13-16), wherein the N-path filter coupled to the transmit path and the N-path filter in the receive path are mixer-first N-path filters.

An example (e.g. example 18) relates to a communication device. The communication device includes: radio frequency (RF) interface means for coupling a transmit path and a receive path to an antenna; and self-interference cancelling (SIC) means for: adapting a transmit signal on the transmit path to generate a replica signal of a self-interference signal; and applying the replica signal to a received signal on the receive path to at least partially remove the self-interference signal from the received signal.

Another example (e.g. example 19) relates to a previously-described example (e.g. examples 18), wherein the adapting the transmit signal comprises adjusting a delay of the transmit signal based on a channel response of the RF interface means.

Another example (e.g. example 20) relates to a previously-described example (e.g. one or more of examples 18-19), wherein the SIC means comprises at least one LC tank delay circuit having a cross coupling configured to adjust a quality factor of the LC tank circuit to adjust the delay of the SIC means.

Another example (e.g. example 21) relates to a previously-described example (e.g. example 20), wherein the cross coupling configured to increase a negative transconductance of the LC tank circuit to adjust the quality factor.

Another example (e.g. example 22) relates to a previously-described example (e.g. one or more of examples 18-21), wherein the SIC means comprises a delay cell that includes two LC tank delay circuits in a staggered connection, the delay cell being configured to adjust a delay of the transmit signal, based on a channel response of the RF interface means, to adapt the transmit signal.

Another example (e.g. example 23) relates to a previously-described example (e.g. one or more of examples 18-21), wherein the SIC means comprises two delay cells coupled together, each of the two delay cells including two LC tank delay circuits in a staggered connection, wherein the two delay cells are configured to cooperatively adjust a delay of the transmit signal, based on a channel response of the RF interface means, to adapt the transmit signal.

Another example (e.g. example 24) relates to a previously-described example (e.g. one or more of examples 18-23), further comprising an N-path filtering means coupled to the transmit path and between the SIC means and the transmit path, the N-path filtering means for filtering out a transmit blocker signal from a transmit signal on the transmit path to generate a transmission noise signal, wherein the SIC means is configured to generate the replica signal of the self-interference signal based on the transmission noise signal.

Another example (e.g. example 25) relates to a previously-described example (e.g. example 24), further comprising an N-path filtering means in the receive path and for filtering out the transmit blocker signal from the receive path.

An example (e.g. example 26) relates to transceiver. The transceiver includes a transmit path and a receive path, each of which being coupled to a radio frequency (RF) interface means; and a self-interference cancelling (SIC) means coupled between the transmit and receive paths for cancelling a self-interference signal from a received signal on the receive path based on a transmit signal on the transmit path.

Another example (e.g. example 27) relates to a previously-described example (e.g. example 26), wherein the SIC means is configured to generate a replica signal of the self-interference signal to cancel the self-interference signal from the received signal.

Another example (e.g. example 28) relates to a previously-described example (e.g. example 27), wherein the SIC means is configured to mimic a channel response through the RF interface means to generate the replica signal.

Another example (e.g. example 29) relates to a previously-described example (e.g. example 28), wherein the SIC means has an adjustable delay to mimic the channel response through the RF interface means.

Another example (e.g. example 30) relates to a previously-described example (e.g. one or more of examples 26-29), wherein the SIC means has an adjustable transconductance to adjust a delay of the SIC means.

Another example (e.g. example 31) relates to a previously-described example (e.g. one or more of examples 26-30), wherein the SIC means includes at least one LC tank delay means for adjusting a delay of the SIC means.

Another example (e.g. example 32) relates to a previously-described example (e.g. example 31), wherein the LC tank delay means includes a cross coupling configured to adjust a negative transconductance quality factor of the LC tank delay means to adjust the delay of the SIC means.

Another example (e.g. example 33) relates to a previously-described example (e.g. example 32), wherein the cross coupling is configured to increase a negative transconductance of the LC tank delay means to adjust the quality factor.

Another example (e.g. example 34) relates to a previously-described example (e.g. one or more of examples 26-33), wherein the SIC means comprises a delay cell means that includes two LC tank delay means in a staggered connection, the delay cell means being configured to adjust a delay of the SIC means to mimic a channel response through the RF interface means.

Another example (e.g. example 35) relates to a previously-described example (e.g. one or more of examples 26-33), wherein the SIC means comprises two delay cell means coupled together, each of the two delay cell means including two LC tank delay means in a staggered connection, wherein a quality factor of each of the two delay cell means is adjustable to adjust a delay of the SIC means to mimic a channel response through the RF interface means.

Another example (e.g. example 36) relates to a previously-described example (e.g. one or more of examples 31-35), wherein the LC tank delay means have an adjustable center frequency and quality factor, an adjustment of a respective center frequency and quality factor including: an increase in a negative transconductance of each of the LC tank delay means to produce self-oscillation so as to measure and tune each LC tank resonance frequency of the LC tank delay means; and with the LC tank delay means configured in a ring oscillator arrangement, a measurement of a ring oscillation frequency and a tuning of the negative transconductance to achieve a desired quality factor.

Another example (e.g. example 37) relates to a previously-described example (e.g. one or more of examples 26-36), further comprising an N-path filtering means coupled to the transmit path and between the SIC means and the transmit path, the N-path filtering means being configured to filter out a transmit blocker signal from a transmit signal on the transmit path to generate a transmission noise signal, wherein the SIC means is configured to: generate a replica signal of the self-interference signal based on the transmission noise signal, and cancel the self-interference signal from the received signal based on the replica signal.

Another example (e.g. example 38) relates to a previously-described example (e.g. example 37), further comprising an N-path filtering means in the receive path for filtering out the transmit blocker signal from the receive path.

Another example (e.g. example 39) relates to a previously-described example (e.g. one or more of examples 37-38), wherein the N-path filtering means coupled to the transmit path is an N-path notch filter.

Another example (e.g. example 40) relates to a previously-described example (e.g. one or more of examples 38-39), wherein the N-path filtering means in the receive path is an N-path bandpass filter.

Another example (e.g. example 41) relates to a previously-described example (e.g. one or more of examples 38-39), wherein the N-path filtering means in the receive path is a mixer-first N-path filter.

Another example (e.g. example 42) relates to a previously-described example (e.g. one or more of examples 38-41), wherein the N-path filtering means coupled to the transmit path and the N-path filtering means in the receive path are mixer-first N-path filters.

An apparatus as shown and described.

A method as shown and described.

CONCLUSION

The devices described herein may be implemented in hardware (e.g., circuits), firmware, software, or any combination thereof. The configurations may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit, and may also be referred to as a "processing circuit," "processing circuitry," "processor circuitry," among others. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, as described herein, may also be understood as a processor, controller, or logic circuit. It is understood that any two (or more) of the processors, controllers, or logic circuits detailed herein may be realized as a single entity with equivalent functionality, among others, and conversely that any single processor, controller, or logic circuit detailed herein may be realized as two (or more) separate entities with equivalent functionality, among others. A processor or a controller can be "hard-coded" with instructions to perform corresponding function(s). Alternatively, the processor or controller can access an internal and/or external memory to retrieve instructions stored in the memory, which when executed by the processor/controller, perform the corresponding function(s) associated with the processor/controller, and/or one or more functions and/or operations related to the operation of a component having the processor/controller included therein.

As used herein, "memory" is understood as a computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e., unidirectional or bidirectional communication in one or both of the incoming and outgoing directions. The term "calculate" encompasses both 'direct' calculations via a mathematical expression/formula/relationship and 'indirect' calculations via lookup or hash tables and other array indexing or searching operations.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The invention claimed is:

1. A transceiver, comprising:
a transmit path and a receive path, each of which being coupled to a radio frequency (RF) interface; and
a self-interference canceller (SIC) coupled between the transmit and receive paths and configured to: mimic a channel response through the RF interface to generate a replica signal, and cancel a self-interference signal from a received signal on the receive path based on the replica signal.

2. The transceiver of claim 1, wherein the SIC includes at least one LC tank delay circuit configured to adjust a delay of the SIC, the LC tank delay circuit including a cross coupling configured to adjust a quality factor of the LC tank delay circuit to adjust the delay of the SIC.

3. The transceiver of claim 2, wherein the cross coupling is configured to increase a negative transconductance of the LC tank delay circuit to adjust the quality factor.

4. The transceiver of claim 1, wherein the SIC comprises a delay cell that includes two LC tank delay circuits in a staggered connection, the delay cell being configured to adjust a delay of the SIC to mimic the channel response through the RF interface.

5. The transceiver of claim 1, wherein the SIC comprises two delay cells coupled together, each of the two delay cells including two LC tank delay circuits in a staggered connection, wherein a quality factor of each of the two delay cells is adjustable to adjust a delay of the SIC to mimic the channel response through the RF interface.

6. The transceiver of claim 5, wherein the LC tank delay circuits have an adjustable center frequency and quality factor, an adjustment of a respective center frequency and quality factor including:
an increase in a negative transconductance of each of the LC tank delay circuits to produce self-oscillation so as to measure and tune each LC tank resonance frequency of the LC tank delay circuits; and
with the LC tank delay circuits configured in a ring oscillator arrangement, a measurement of a ring oscillation frequency and a tuning of the negative transconductance to achieve a desired quality factor.

7. The transceiver of claim 1, further comprising an N-path filter coupled to the transmit path and between the SIC and the transmit path, the N-path filter being configured to filter out a transmit blocker signal from a transmit signal on the transmit path to generate a transmission noise signal, wherein the SIC is configured to:
generate a replica signal of the self-interference signal based on the transmission noise signal, and
cancel the self-interference signal from the received signal based on the replica signal.

8. The transceiver of claim 7, further comprising an N-path filter in the receive path and configured to filter out the transmit blocker signal from the receive path.

9. The transceiver of claim 8, wherein:
the N-path filter in the receive path is an N-path bandpass filter;
the N-path filter in the receive path is a mixer-first N-path filter; or
the N-path filter coupled to the transmit path and the N-path filter in the receive path are mixer-first N-path filters.

10. A communication device comprising:
radio frequency (RF) interface means for coupling a transmit path and a receive path to an antenna; and
self-interference cancelling (SIC) means for:
adapting a transmit signal on the transmit path, based on a channel response of the RF interface means, to generate a replica signal of a self-interference signal; and
applying the replica signal to a received signal on the receive path to at least partially remove the self-interference signal from the received signal.

11. The communication device of claim 10, wherein the SIC means comprises at least one LC tank delay circuit having a cross coupling configured to adjust a quality factor of the LC tank delay circuit to adjust a delay of the SIC means.

12. The communication device of claim 11, wherein the cross coupling is configured to increase a negative transconductance of the LC tank delay circuit to adjust the quality factor.

13. The communication device of claim 10, wherein the SIC means comprises a delay cell that includes two LC tank delay circuits in a staggered connection, the delay cell being configured to adjust a delay of the transmit signal, based on the channel response of the RF interface means, to adapt the transmit signal.

14. The communication device of claim 10, wherein the SIC means comprises two delay cells coupled together, each of the two delay cells including two LC tank delay circuits in a staggered connection, wherein the two delay cells are configured to cooperatively adjust a delay of the transmit signal, based on the channel response of the RF interface means, to adapt the transmit signal.

15. The communication device of claim 10, further comprising an N-path filtering means coupled to the transmit path and between the SIC means and the transmit path, the N-path filtering means for filtering out a transmit blocker signal from a transmit signal on the transmit path to generate a transmission noise signal, wherein the SIC means is configured to generate the replica signal of the self-interference signal based on the transmission noise signal.

16. The communication device of claim 15, further comprising an N-path filtering means in the receive path and for filtering out the transmit blocker signal from the receive path.

17. The communication device of claim 10, wherein the adapting the transmit signal comprises simulating the channel response of the RF interface means.

18. A transceiver, comprising:
a transmit path and a receive path, each of which being coupled to a radio frequency (RF) interface; and
a self-interference canceller (SIC) coupled between the transmit and receive paths and configured to cancel a self-interference signal from a received signal on the receive path based on a transmit signal on the transmit path, wherein the SIC includes a delay circuit having a cross coupling configured to adjust a quality factor of the delay circuit to adjust a delay of the SIC.

19. The transceiver of claim 18, wherein the cross coupling is configured to increase a negative transconductance of the delay circuit to adjust the quality factor.

* * * * *